(12) United States Patent
Alameh et al.

(10) Patent No.: US 10,755,694 B2
(45) Date of Patent: Aug. 25, 2020

(54) ELECTRONIC DEVICE WITH VOICE-SYNTHESIS AND ACOUSTIC WATERMARK CAPABILITIES

(71) Applicant: Motorola Mobility LLC, Chicago, IL (US)

(72) Inventors: Rachid Alameh, Crystal Lake, IL (US);
James P Ashley, Naperville, IL (US);
Jarrett Simerson, Glenview, IL (US);
Thomas Merrell, Beach Park, IL (US)

(73) Assignee: Motorola Mobility LLC, Chicago, IL (US)

( * ) Notice: Subject to any disclaimer, the term of this patent is extended or adjusted under 35 U.S.C. 154(b) by 72 days.

(21) Appl. No.: 15/922,852

(22) Filed: Mar. 15, 2018

(65) Prior Publication Data

US 2019/0287513 A1    Sep. 19, 2019

(51) Int. Cl.

| G10L 13/033 | (2013.01) |
| G10L 19/018 | (2013.01) |
| G10L 13/047 | (2013.01) |
| G06F 3/0482 | (2013.01) |
| G10L 17/00 | (2013.01) |
| G10L 25/48 | (2013.01) |

(52) U.S. Cl.
CPC ........ *G10L 13/0335* (2013.01); *G06F 3/0482* (2013.01); *G10L 13/033* (2013.01); *G10L 13/047* (2013.01); *G10L 17/005* (2013.01); *G10L 19/018* (2013.01); *G10L 25/48* (2013.01)

(58) Field of Classification Search
CPC ..... G10L 13/02; G10L 13/033; G10L 19/018; G10L 17/04; G10L 17/06; G10L 17/22; G10L 17/24; G10L 17/005

USPC ............... 704/258, 260, 269, 273, 246, 250
See application file for complete search history.

(56) References Cited

U.S. PATENT DOCUMENTS

| 6,480,825 | B1 | 11/2002 | Sharma et al. | |
| 8,311,830 | B2 * | 11/2012 | Campbell | G10L 13/033 704/258 |
| 8,442,824 | B2 * | 5/2013 | Aley-Raz | G10L 17/24 704/247 |
| 8,699,944 | B2 * | 4/2014 | Malamud | H04L 63/0861 704/270 |
| 9,082,413 | B2 * | 7/2015 | Herring | G10L 25/51 |
| 9,305,148 | B2 | 4/2016 | Rhoads | |
| 9,621,603 | B2 * | 4/2017 | Vadla Ravnas | G06Q 10/10 |
| 9,721,558 | B2 * | 8/2017 | Bangalore | G10L 13/06 |
| 9,818,414 | B2 * | 11/2017 | Phielipp | G10L 19/018 |

(Continued)

OTHER PUBLICATIONS

"Creating Personal Voice for All", ModelTalker System; www.modeltalker.org; Developed by Nemours Speech Research Laboratory; Site visited Feb. 21, 2018, (6 pages).

(Continued)

*Primary Examiner* — Martin Lerner
(74) *Attorney, Agent, or Firm* — Philip H. Burrus, IV

(57) ABSTRACT

An electronic device includes an audio synthesizer. The audio synthesizer can generate a voice-synthesized audio output stream as a function of one or more audible characteristics extracted from voice input received from an authorized user of the electronic device. The audio synthesizer can also apply an acoustic watermark to the voice-synthesized audio output stream, the acoustic watermark indicating that the voice-synthesized audio output stream is machine made.

17 Claims, 7 Drawing Sheets

(56) References Cited

U.S. PATENT DOCUMENTS

| | | | |
|---|---|---|---|
| 10,079,024 B1 | 9/2018 | Bhimanaik et al. | |
| 10,455,277 B2 | 10/2019 | Shaw | |
| 10,475,464 B2* | 11/2019 | Park | G10L 21/00 |
| 2002/0078357 A1* | 6/2002 | Bruekers | G10L 19/018 |
| | | | 713/176 |
| 2002/0168089 A1* | 11/2002 | Guenther | G10L 19/018 |
| | | | 382/100 |
| 2005/0010417 A1* | 1/2005 | Holmes | H04M 1/6066 |
| | | | 704/275 |
| 2006/0019605 A1* | 1/2006 | Shau | H04B 5/0006 |
| | | | 455/66.1 |
| 2006/0095265 A1* | 5/2006 | Chu | G10L 13/033 |
| | | | 704/268 |
| 2006/0282649 A1* | 12/2006 | Malamud | H04L 63/0861 |
| | | | 712/26 |
| 2007/0061145 A1* | 3/2007 | Edgington | G10L 13/033 |
| | | | 704/262 |
| 2009/0044112 A1 | 2/2009 | Basso et al. | |
| 2009/0157406 A1* | 6/2009 | Iwaki | G10L 19/018 |
| | | | 704/258 |
| 2011/0144997 A1* | 6/2011 | Mizuguchi | G10L 13/06 |
| | | | 704/258 |
| 2013/0036223 A1* | 2/2013 | Du | G06F 21/44 |
| | | | 709/225 |
| 2013/0097630 A1 | 4/2013 | Rodriguez | |
| 2013/0132729 A1 | 5/2013 | Arnold | |
| 2013/0282371 A1* | 10/2013 | Alameh | G10L 15/26 |
| | | | 704/275 |
| 2014/0123010 A1 | 5/2014 | Goldstein | |
| 2014/0173748 A1 | 6/2014 | Esmailzdeh | |
| 2015/0023546 A1 | 1/2015 | Strein | |
| 2015/0036873 A1* | 2/2015 | Petrovic | G10L 19/018 |
| | | | 382/100 |
| 2015/0055764 A1* | 2/2015 | Gilbert | G10L 17/14 |
| | | | 379/88.02 |
| 2016/0099003 A1* | 4/2016 | Nakamura | G10L 19/018 |
| | | | 704/267 |
| 2016/0171980 A1 | 6/2016 | Liddell et al. | |
| 2016/0227035 A1* | 8/2016 | Kumar | G10L 17/24 |
| 2017/0004294 A1* | 1/2017 | Agrawal | G10L 17/24 |
| 2017/0178632 A1* | 6/2017 | Li | G10L 17/06 |
| 2018/0005637 A1* | 1/2018 | Tachibana | G10L 13/02 |
| 2018/0025724 A1 | 1/2018 | Hunt et al. | |
| 2018/0025733 A1 | 1/2018 | Qian et al. | |
| 2018/0174570 A1* | 6/2018 | Tamura | G10L 13/0335 |
| 2018/0174590 A1* | 6/2018 | Kurian | G10L 17/02 |
| 2020/0005762 A1* | 1/2020 | Alameh | G10L 13/033 |

OTHER PUBLICATIONS

"Emoto-Tronic Furbies", Furby Manual; Site visited Feb. 21, 2018; http://furbymanual.com/emoto-tronic-furbies/, (4 pages).

"Furby Guide", Emoto-Tronic Care Guide; Downloaded Feb. 21, 2018, (16 pages).

"Set up Voice Match on Google Home", Google Home Help Page; Instructions and Functionality; Downloaded Feb. 21, 2018; https://support.google.com/googlehome/answer/7323910?hl=en, (3 pages).

"This is Why Simulations Should Use Emotive Synthetic Voices", Euphony; Published at https://arvrjourney.com; Downloaded Feb. 21, 2018, (5 pages).

Kirovski, Darko et al., "Spread-Spectrum Watermarking of Audio Signals", IEEE Transaction on Signal Processing, vol. 51, No. 4, Apr. 2003, (pp. 1020 to 2033).

Montag, Matt , "Universal's Audible Watermark", Personal Blog; Updated Jan. 14, 2015; https://www.mattmontag.com/music/universals-audible-watermark, (19 pages).

Sallabank, Alan , "Adobe Reveal Project VoCo Speech Synthesis Technology", Pro Tools Blog; Published Nov. 7, 2016; https://www.pro-tools-expert.com, (6 pages).

Lerner, Martin, "Ex Parte Quayle Action", U.S. Appl. No. 16/565,253, dated Mar. 30, 2020.

\* cited by examiner

ELECTRONIC DEVICE WITH VOICE-SYNTHESIS AND ACOUSTIC WATERMARK CAPABILITIES

BACKGROUND

Technical Field

This disclosure relates generally to electronic devices, and more particularly to electronic devices with voice assistant capabilities.

Background Art

Modern portable electronic communication devices including numerous features beyond those associated with simply making voice telephone calls. Smartphones, for example, can be used to send text messages or multimedia messages, capture videos, make financial transactions, and surf the Internet. A modern smartphone places more computing power in a pocket than was offered by large desktop computers of only a decade ago.

Some of these electronic devices include voice assistant capabilities. Such voice assistants can simplify electronic device interaction, as a user can speak commands to an electronic device rather than having to physically manipulate the electronic device. While some features of voice assistants are satisfactory, it would be advantageous to have increased voice assistant capabilities to broaden the beneficial and productive capabilities of these device features.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present disclosure.

Figure 1:
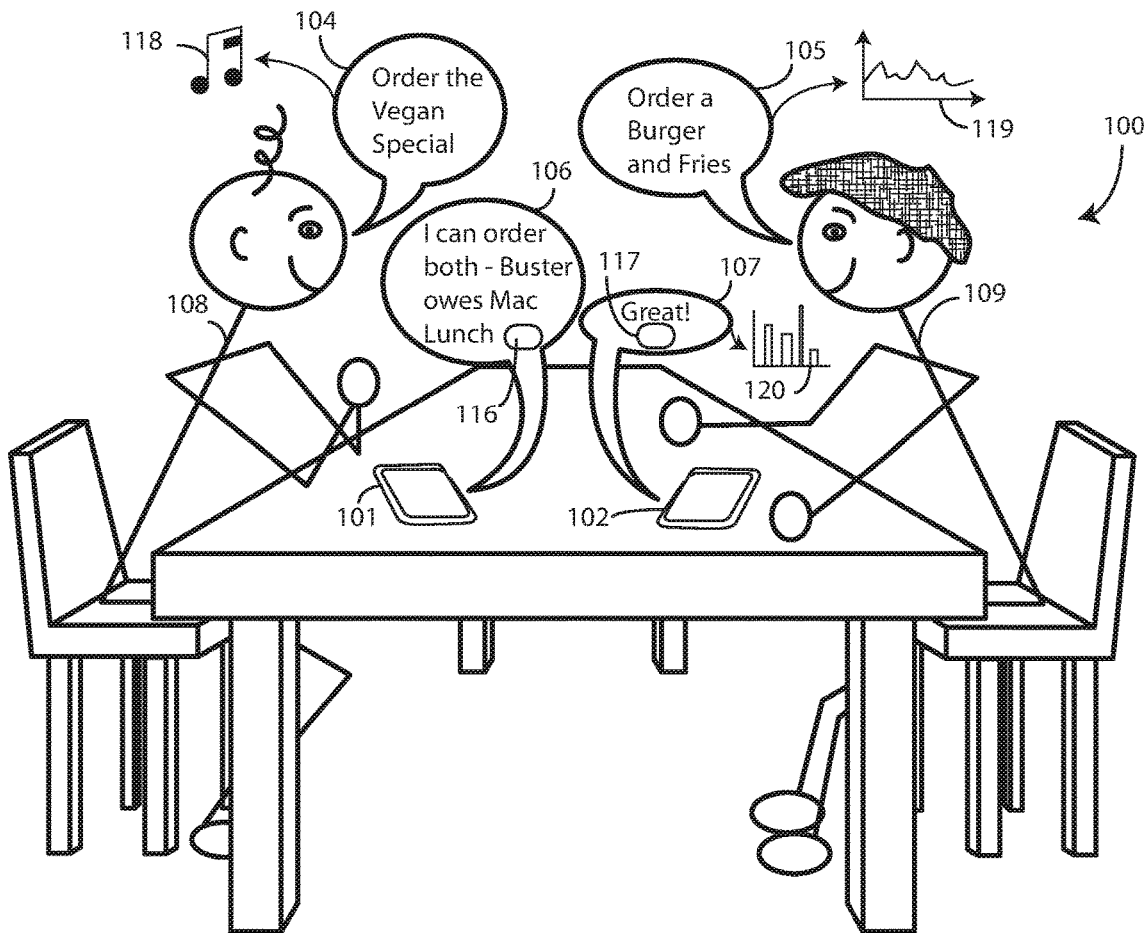
FIG. 1 illustrates one explanatory system, method, and environment in accordance with one or more embodiments of the disclosure.
Figure 1:
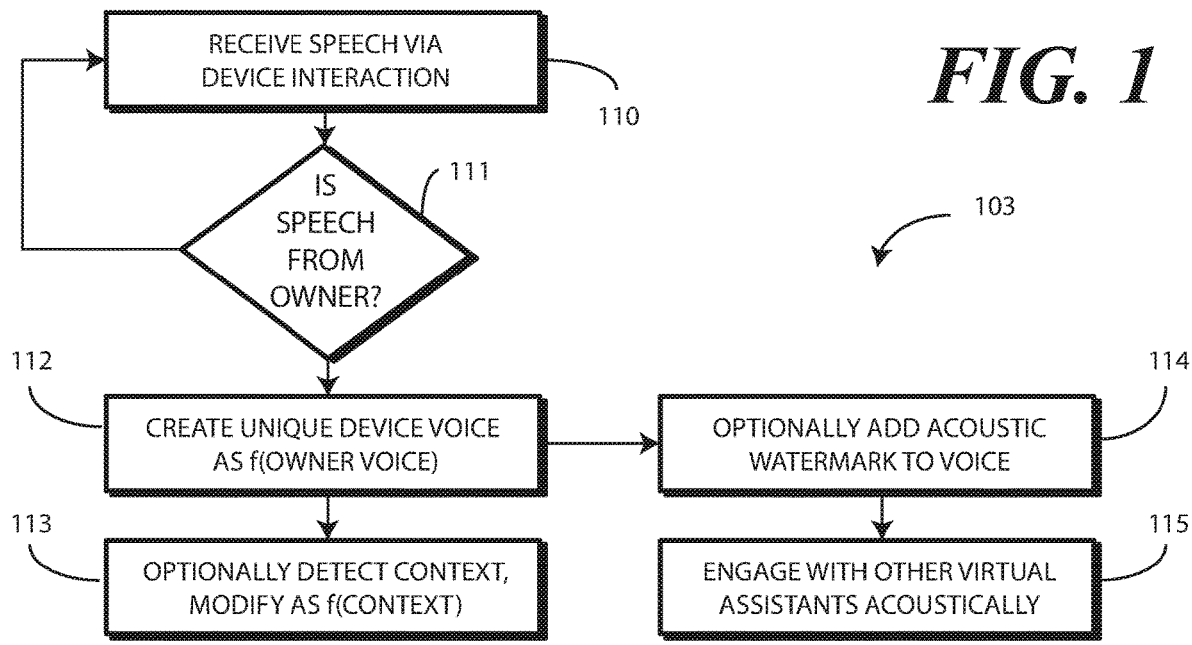

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to creating, delivering, and receiving voice-synthesized audio output streams in electronic devices. Any process descriptions or blocks in flow charts should be understood as representing modules, segments, or portions of code that include one or more executable instructions for implementing specific logical functions or steps in the process. Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

Embodiments of the disclosure do not recite the implementation of any commonplace business method aimed at processing business information, nor do they apply a known business process to the particular technological environment of the Internet. Moreover, embodiments of the disclosure do not create or alter contractual relations using generic computer functions and conventional network operations. Quite to the contrary, embodiments of the disclosure employ methods that, when applied to electronic device and/or user interface technology, improve the functioning of the electronic device itself by and improving the overall user experience to overcome problems specifically arising in the realm of the technology associated with electronic device user interaction.

It will be appreciated that embodiments of the disclosure described herein may be comprised of one or more conventional processors and unique stored program instructions that control the one or more processors to implement, in conjunction with certain non-processor circuits, some, most, or all of the functions of generating voice-synthesized audio output streams, applying acoustic watermarks, or identifying electronic devices having voice assistant capabilities as described herein. The non-processor circuits may include, but are not limited to, a radio receiver, a radio transmitter, signal drivers, clock circuits, power source circuits, and user input devices. As such, these functions may be interpreted as steps of a method to perform the generation and/or processing and manipulation of voice-synthesized audio output streams as a function of one or more audible characteristics extracted from voice input received from an authorized user of the electronic device. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ASICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions.

As used herein, components may be "operatively coupled" when information can be sent between such components, even though there may be one or more intermediate or intervening components between, or along the connection path. The terms "substantially" and "about" are used to refer to dimensions, orientations, or alignments inclusive of manufacturing tolerances. Thus, a "substantially orthogonal" angle with a manufacturing tolerance of plus or minus two degrees would include all angles between 88 and 92, inclusive. Also, reference designators shown herein in parenthesis indicate components shown in a figure other than the one in discussion. For example, talking about a device (10) while discussing figure A would refer to an element, 10, shown in figure other than figure A.

Embodiments of the disclosure provide an electronic device with voice assistant capabilities. In one or more embodiments, the "voice" generated by the voice assistant, which constitutes a voice-synthesized audio output stream, is a function of one or more audible characteristics, such as pitch, timbre, cadence, rhythm, volume, spectrum, and so forth, extracted from voice input received from an authorized user of the electronic device.

Illustrating by example, in one or more embodiments when voice input—or any biometric input for that matter—is received from an authorized user of an electronic device, one or more of these audible characteristics can be extracted from that input. These characteristics can be used, in one embodiment, to modify a predefined voice synthesis model of an audio synthesizer to give the voice-synthesized audio output stream characteristics of the authorized user's voice. In another embodiment, the characteristics can be used to make the voice, i.e., the voice-synthesized audio output stream, of the voice assistant mimic and/or resemble the voice of the authorized user. This customization of the voice-synthesized audio output stream of the voice assistant from a generic voice to a voice defined as a function of audible characteristics of the authorized user voice allows other people—as well as other voice assistants—to distinguish one electronic device from another based upon the voice of the voice assistant.

In one or more embodiments, since the customized voice-synthesized audio output stream can sound similar, or even identical, to the voice of the authorized user, the audio synthesizer applies an acoustic watermark to the voice-synthesized audio output stream. An acoustic watermark is a voice-synthesized audio output stream that also has an acoustic signal, which can be inaudible or imperceptible to a user, integrated into the voice-synthesized audio output stream that can be identified by a machine. The acoustic watermark can carry data, such as an identity of the electronic device, its owner, or other information. In one or more embodiments, the voice-synthesized audio output stream includes an acoustic watermark that indicates that the voice-synthesized audio output stream was machine made.

This inclusion of the acoustic watermark allows another electronic device to distinguish a person's voice from the voice-synthesized audio output stream generated from that person's electronic device when the voice-synthesized audio output stream is generated as a function of one or more audible characteristics of the user's voice. Thus, an electronic device having a voice assistant can, advantageously, distinguish voice sounds coming from a person and that person's electronic device. Moreover, embodiments of the disclosure allow for an electronic device to distinguish between electronic devices having voice assistants, as each voice assistant will have a distinct and unique voice-synthesized audio output stream.

Illustrating by example, in one or more embodiments an electronic device having voice assistant capabilities receives, with one or more sensors, a first audio input. Since the voice assistant can recognize the voice of the authorized user of the electronic device, presume for the moment that the first audio input is a voice from an unauthorized user of the electronic device.

Before, after, or while this first audio input is being received, the one or more sensors may also receive a second audio input. Presume for the purposes of this example that the second audio input is a voice carried by a voice-synthesized audio output stream emanating from another electronic device belonging to the unauthorized user whose voice was in the first audio input. In one or more embodiments, this voice-synthesized audio output stream will comprise an acoustic watermark indicating that the second audio input is machine made.

Advantageously, in one or more embodiments the electronic device receiving this first audio input and the second audio input will be able to determine that the other electronic device belongs to the unauthorized user. In one embodiment, where the voice-synthesized audio output stream is a function of one or more audible characteristics of the unauthorized user, one or more processors of the electronic device receiving the audio input can determine whether one or more substantially matching audio characteristics are present in both the first audio input and the second audio input. Where they are, the one or more processors can identify, in a memory of the electronic device, the first audio input as emanating from the other electronic device belonging to the unauthorized user.

In another embodiment, data is encoded into the acoustic watermark present in the second audio input. In this embodiment, rather than matching audio characteristics common to both the first audio input and the second audio input, the one or more processors can simply read the data in the acoustic watermark. This data can include an identifier of the other electronic device, such as an International Mobile Equipment Identity (IMEI) number, a Subscriber Identification Module (SIM) number, or other identifier of the electronic device. Similarly, the data can include an identifier of the owner of the electronic device. Thus, if the first audio input was received from a person named Buster, the data in the acoustic watermark may include indicia indicating that the electronic device belongs to Buster. As such, in one or more embodiments the one or more processors can identify the unauthorized user from an identifier encoded into the acoustic watermark. Additionally, in one or more embodiments the one or more processors can identify, in a memory of the electronic device, the first audio input as emanating from another electronic device belonging to the unauthorized user.

Embodiments of the disclosure contemplate that there is a need to make voice assistant interaction with electronic devices more like interacting with a human assistant. Embodiments of the disclosure also contemplate that there is a need for improved interaction by not only listening in to voice assistant information, but also by associating the detected information with whom the electronic device having the voice assistant belongs, the identity of the electronic device, as well as other information. In addition to associating the voice assistant with the device owner, embodiments of the disclosure also contemplate that there is value in certain situations to cause the voice assistant to resemble and/or mimic the voice of the owner, thereby creating a new level of personalization and human sound identity. Embodiments of the disclosure can, in one or more embodiments, do all of this and more.

Turning now to FIG. 1, illustrated therein is one environment 100, electronic devices 101,102, and method 103 configured in accordance with one or more embodiments of the disclosure. In this illustration, each electronic device 101,102 includes a voice assistant module. One or more processors in each electronic device 101,102 are operable with, or control and/or execute, the voice assistant modules to receive audio input from one or more microphones and to process the same to execute voice recognition procedures on the received audio input, as well as to generate and deliver a voice-synthesized audio output stream via one or more loudspeakers of each electronic device 101,102.

In one or more embodiments, the voice assistant module is configured as executable code for the one or more processors and is stored in a memory of each electronic device 101,102. In other embodiments, the voice assistant module is configured as a dedicated chip or hardware module. Other configurations for voice assistant modules will be obvious to those of ordinary skill in the art having the benefit of this disclosure.

Figure 2:
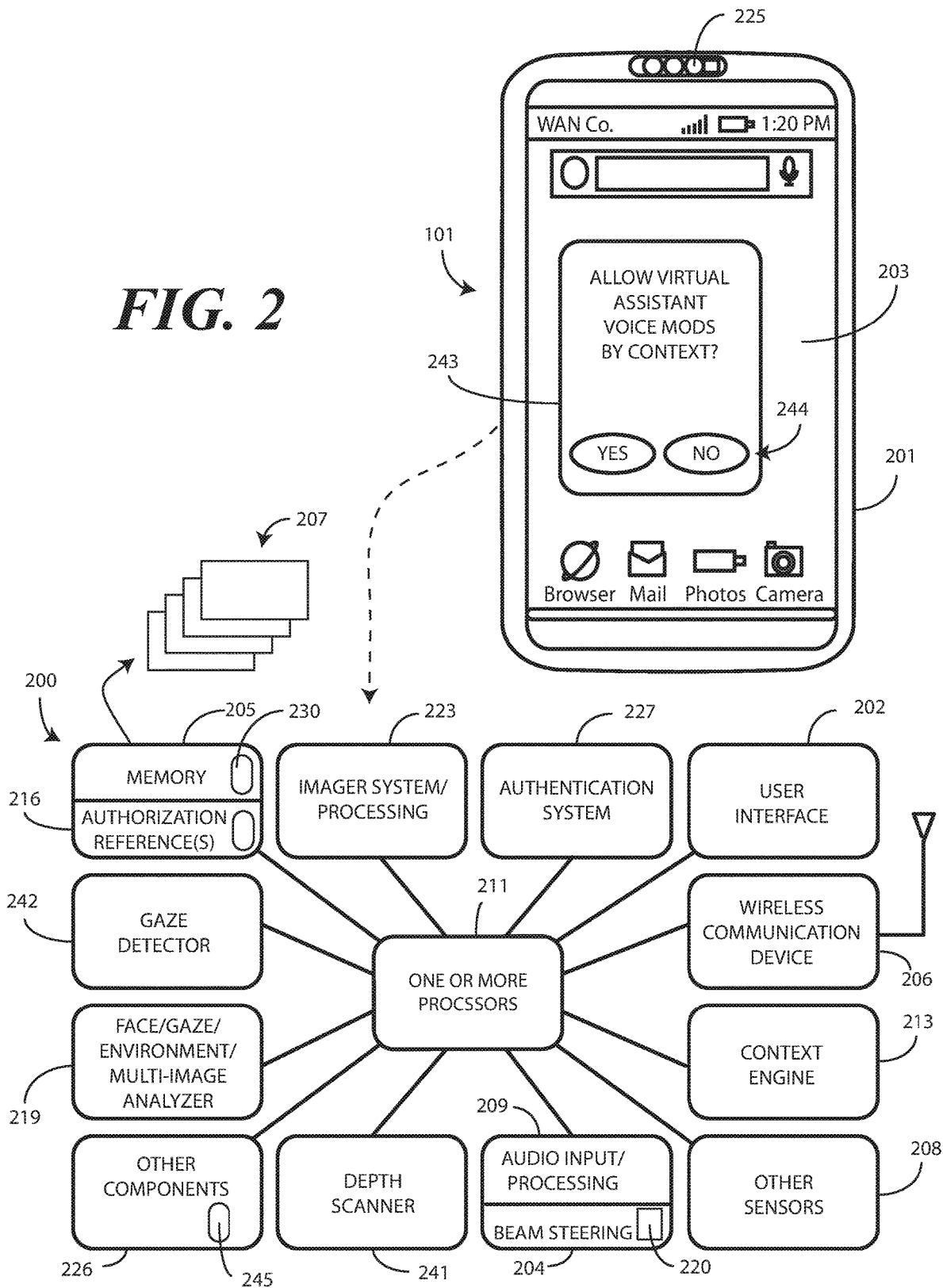
FIG. 2 illustrates one explanatory electronic device in accordance with one or more embodiments of the disclosure.

Turning briefly to FIG. 2, illustrated therein is one explanatory block diagram schematic 200 of one explanatory electronic device 101 from FIG. 1. In one or more embodiments, the block diagram schematic 200 is configured as a printed circuit board assembly disposed within a housing 201 of the electronic device 101. Various components can be electrically coupled together by conductors or a bus disposed along one or more printed circuit boards.

The illustrative block diagram schematic 200 of FIG. 2 includes many different components. Embodiments of the disclosure contemplate that the number and arrangement of such components can change depending on the particular application. Accordingly, electronic devices configured in accordance with embodiments of the disclosure can include some components that are not shown in FIG. 2, and other components that are shown may not be needed and can therefore be omitted.

The illustrative block diagram schematic 200 includes a user interface 202. In one or more embodiments, the user interface 202 optionally includes a display 203, which may optionally be touch-sensitive. However, in other embodiments the electronic device 101 will include no display. Embodiments of the disclosure contemplate that many voice assisted devices operate via audio alone, without the necessity of a display. Where a display 203 is included, in one embodiment, users can deliver user input to the display 203 of such an embodiment by delivering touch input from a finger, stylus, or other objects disposed proximately with the display 203. In one embodiment, the display 203 is configured as an active matrix organic light emitting diode (AMO-LED) display. However, it should be noted that other types of displays, including liquid crystal displays, suitable for use with the user interface 202 would be obvious to those of ordinary skill in the art having the benefit of this disclosure.

In one embodiment, the electronic device includes one or more processors 211. In one embodiment, the one or more processors 211 can include an application processor and, optionally, one or more auxiliary processors. One or both of the application processor or the auxiliary processor(s) can include one or more processors. One or both of the application processor or the auxiliary processor(s) can be a microprocessor, a group of processing components, one or more ASICs, programmable logic, or other type of processing device. The application processor and the auxiliary processor(s) can be operable with the various components of the block diagram schematic 200. Each of the application processor and the auxiliary processor(s) can be configured to process and execute executable software code to perform the various functions of the electronic device with which the block diagram schematic 200 operates. A storage device, such as memory 205, can optionally store the executable software code used by the one or more processors 211 during operation.

In this illustrative embodiment, the block diagram schematic 200 also includes a communication circuit 206 that can be configured for wired or wireless communication with one or more other devices or networks. The networks can include a wide area network, a local area network, and/or personal area network. Examples of wide area networks include GSM, CDMA, W-CDMA, CDMA-2000, iDEN, TDMA, 2.5 Generation 3GPP GSM networks, 3rd Generation 3GPP WCDMA networks, 3GPP Long Term Evolution (LTE) networks, and 3GPP2 CDMA communication networks, UMTS networks, E-UTRA networks, GPRS networks, iDEN networks, and other networks. The communication circuit 206 may also utilize wireless technology for communication, such as, but are not limited to, peer-to-peer or ad hoc communications such as HomeRF, Bluetooth and IEEE 802.11 (a, b, g or n); and other forms of wireless communication such as infrared technology. The communication circuit 206 can include wireless communication circuitry, one of a receiver, a transmitter, or transceiver, and one or more antennas.

In one embodiment, the one or more processors 211 can be responsible for performing the primary functions of the electronic device with which the block diagram schematic 200 is operational. For example, in one embodiment the one or more processors 211 comprise one or more circuits operable with the user interface 202 to present presentation information to a user. The executable software code used by the one or more processors 211 can be configured as one or more modules 207 that are operable with the one or more processors 211. Such modules 207 can store instructions, control algorithms, and so forth.

In one or more embodiments, the block diagram schematic 200 includes an audio processor 209, which functions as both an audio synthesizer and, in coordination with the one or more processors 211, as the voice assistant module. In one or more embodiments, the audio processor 209 is capable of receiving audio input, processing audio input, generating voice-synthesized audio output streams from one or more predefined voice synthesis models 230 stored in the memory 205, modifying the one or more predefined voice synthesis models 230 stored in the memory, generating unique voice-synthesized audio output streams, and performing other functions. For example, in one or more embodiments the audio processor 209 is operable to receive audio input from an environment about the electronic device 101.

The audio processor 209 can include hardware, executable code, and speech monitoring and generation executable code in one embodiment. The audio processor 209 can be operable with one or more predefined authentication references 216 stored in memory 205. With reference to audio input, the predefined authentication references 216 can comprise representations of basic speech models, representations of trained speech models, or other representations of predefined audio sequences that are used by the audio processor 209 to receive and identify voice commands that are received with audio input captured by an audio capture device. In one embodiment, the audio processor 209 can include a voice recognition engine. Regardless of the specific implementation utilized in the various embodiments, the audio processor 209 can access various speech models stored with the predefined authentication references 216 to identify speech commands. The audio processor 209 can also generate voice-synthesized streams, such as with the audio modulator that will be discussed in more detail below with reference to FIG. 4.

The audio processor 209 can include a beam steering engine 204 in one or more embodiments. In one or more embodiments, the beam steering engine 204 comprises one or more microphones 220. Input from the one or more microphones 220 can be processed in the beam steering engine 204 such that the one or more microphones define a virtual microphone. This virtual microphone can define an acoustic reception cone that can be virtually "steered" around the electronic device 101. Alternatively, actual steering can occur as well, such as switching between a left and right microphone or a front and back microphone, or switching various microphones ON and OFF individually. In one or more embodiments, two or more microphones 220 can be included for selective beam steering by the beam steering engine 204.

Illustrating by example, a first microphone can be located on a first side of the electronic device 101 for receiving audio input from a first direction, while a second microphone can be placed on a second side of the electronic device 101 for receiving audio input from a second direction. These microphones can be "steered" by selectively turning them ON and OFF.

The beam steering engine 204 can then select between the first microphone and the second microphone to beam steer audio reception toward an object, such as a user delivering audio input. This beam steering can be responsive to input from other sensors, such as imagers, facial depth scanners, thermal sensors, or other sensors. For example, an imager can estimate a location of a person's face and deliver signals to the beam steering engine 204 alerting it in which direction to focus the acoustic reception cone and/or steer the first microphone and the second microphone, thereby adding confirmation to audio steering and saving time. Where multiple people are around the electronic device 101, as was the case in FIG. 1, this steering advantageously directs a beam reception cone to the authorized user.

Alternatively, the beam steering engine 204 processes and combines the signals from two or more microphones to perform beam steering. The one or more microphones 220 can be used for voice commands. In response to control of the one or more microphones 220 by the beam steering engine 204, a user location direction can be determined. The beam steering engine 204 can then select between the first microphone and the second microphone to beam steer audio reception toward the user. Alternatively, the audio processor 209 can employ a weighted combination of the microphones to beam steer audio reception toward the user.

In one embodiment, the audio processor 209 is configured to implement a voice control feature that allows a user to speak a specific device command to cause the one or more processors 211 to execute a control operation. For example, the user may say, "Authenticate Me Now." This statement comprises a device command requesting the one or more processors to cooperate with the authentication system 227 to authenticate a user. Consequently, this device command can cause the one or more processors 211 to access the authentication system 227 and begin the authentication process. In short, in one embodiment the audio processor 209 listens for voice commands, processes the commands and, in conjunction with the one or more processors 211, performs a touchless authentication procedure in response to voice input.

The audio processor 209 can also extract, read, and/or manipulate acoustic watermarks present in received input. For example, where data such as an identifier of an electronic device, an identifier of an owner of the electronic device, or other information, such as user profile, is encoded into an acoustic watermark integrated with audio input, the audio processor 209 can extract this information from the acoustic watermark and deliver it to the one or more processors 211.

The one or more processors 211 can perform filtering operations on audio input received by the audio processor 209. For example, in one embodiment the one or more processors 211 can filter the audio input into authorized user generated audio input, i.e., first voice (104), and other audio input, i.e., second voice (105).

Figure 3:
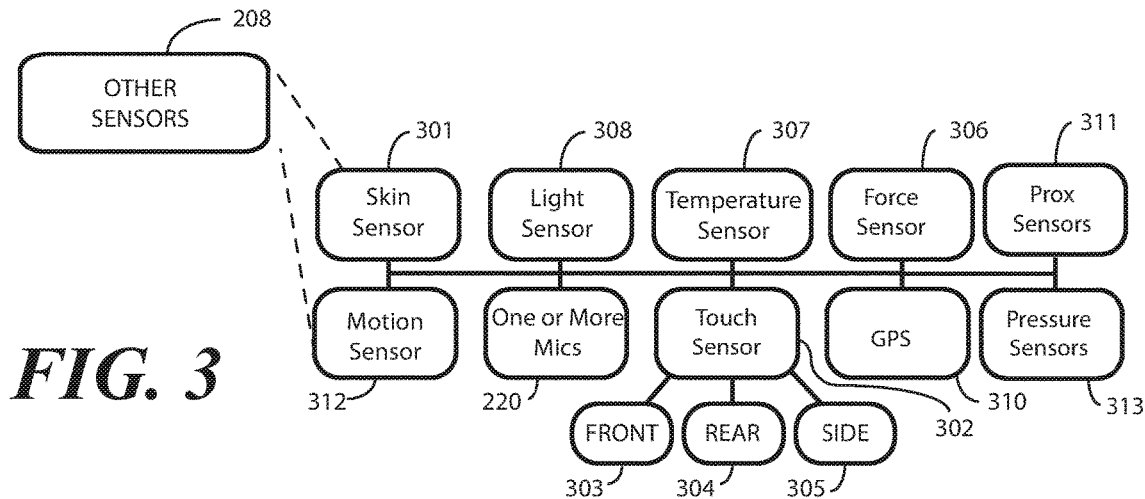
FIG. 3 illustrates one or more explanatory sensors in accordance with one or more embodiments of the disclosure.

Various sensors 208 can be operable with the one or more processors 211. Turning briefly to FIG. 3, illustrated therein are examples of some sensors that can be operable with the one or more processors (211) as well. General examples of these sensors include time sensors, date sensors, environmental sensors, weather sensors, ultrasonic sensors, location sensors, and so forth.

In one embodiment, a skin sensor 301 is configured to determine when the electronic device is touching the skin of a person. For example, the skin sensor 301 can detect when the electronic device is being held within the hand of a user. The skin sensor 301 can include a substrate with an electrode disposed thereon. The electrode can confirm the object touching the skin sensor 301 is skin by detecting electrical signals generated by a heartbeat in one embodiment. Other forms of skin sensors will be obvious to those of ordinary skill in the art having the benefit of this disclosure.

A touch sensor 302 can be operable with, or in place of, the skin sensor 301. The touch sensor 302 can include a capacitive touch sensor, an infrared touch sensor, resistive touch sensors, or another touch-sensitive technology.

In one or more embodiments, the touch sensor 302 comprises a plurality of touch sensors. For example, a first touch sensor 303 can be disposed on the front major face of the electronic device 101. A second touch sensor 304 can be disposed on the rear major face of the electronic device 101. A third touch sensor 305 can be situated along one or more of the minor faces defined by the sides of the electronic device 101.

Capacitive touch-sensitive devices include a plurality of capacitive sensors, e.g., electrodes, which are disposed along a substrate. Each capacitive sensor is configured, in conjunction with associated control circuitry, e.g., the one or more processors (211), to detect an object in close proximity with—or touching—the surface of the display (203) or the housing (201) of the electronic device (101) by establishing electric field lines between pairs of capacitive sensors and then detecting perturbations of those field lines.

The electric field lines can be established in accordance with a periodic waveform, such as a square wave, sine wave, triangle wave, or other periodic waveform that is emitted by one sensor and detected by another. The capacitive sensors can be formed, for example, by disposing indium tin oxide patterned as electrodes on the substrate. Indium tin oxide is useful for such systems because it is transparent and conductive. Further, it is capable of being deposited in thin layers by way of a printing process. The capacitive sensors may also be deposited on the substrate by electron beam evaporation, physical vapor deposition, or other various sputter deposition techniques.

A force sensor 306 can be included. The force sensor 306 can take various forms. For example, in one embodiment, the force sensor 306 comprises resistive switches or a force switch array configured to detect contact with either the display (203) or the housing (201) of the electronic device (101). An "array" refers to a set of at least one switch. The array of resistive switches can function as a force-sensing layer, in that when contact is made with either the surface of the display (203) or the housing (201) or the touch sensors 302 of the electronic device (101), changes in impedance of any of the switches may be detected.

The array of switches may be any of resistance sensing switches, membrane switches, force-sensing switches such as piezoelectric switches, or other equivalent types of technology. In another embodiment, the force sensor 306 can be capacitive. In yet another embodiment, piezoelectric sensors can be configured to sense force as well. For example, where coupled with the lens of the display (203), the piezoelectric sensors can be configured to detect an amount of displacement of the lens to determine force. The piezoelectric sensors can also be configured to determine force of contact against the housing (201) of the electronic device (101) rather than the display (203).

A temperature sensor 307 can be configured to monitor the temperature of the environment about the electronic device (101). A light sensor 308 can be used to detect whether or not ambient light is incident on the housing (201) of the electronic device (101). The light sensor 308 can also be used to detect an intensity of ambient light is above or below a predefined threshold. In one or more embodiments the light sensor 308 can detect changes in optical intensity, color, light, or shadow in the near vicinity of the electronic device (101). In one embodiment, the light sensor 308 can be configured as an image-sensing device that captures successive images about the device and compares luminous intensity, color, or other spatial variations between images to detect weather conditions. One or more microphones 220 can be included to receive acoustic input as previously described.

In one or more embodiments a global positioning system device 310 can be included for determining a location and/or movement of the electronic device (101). In one or more embodiments, the global positioning system device 310 is configured for communicating with a constellation of earth orbiting satellites or a network of terrestrial base stations to determine an approximate location. Examples of satellite positioning systems suitable for use with embodiments of the present invention include, among others, the Navigation System with Time and Range (NAVSTAR) Global Positioning Systems (GPS) in the United States of America, the Global Orbiting Navigation System (GLONASS) in Russia, and other similar satellite positioning systems. The satellite positioning systems based location fixes of the global positioning system device 310 autonomously or with assistance from terrestrial base stations, for example those associated with a cellular communication network or other ground based network, or as part of a Differential Global Positioning System (DGPS), as is well known by those having ordinary skill in the art.

While a global positioning system device 310 is one example of a location determination device, it will be clear to those of ordinary skill in the art having the benefit of this disclosure that other location determination devices, such as electronic compasses or gyroscopes, could be used as well. For example, the global positioning system device 310 can be replaced by, or accompanied by, a location detector able to determine location by locating or triangulating terrestrial base stations of a traditional cellular network, such as a CDMA network or GSM network, or from other local area networks, such as Wi-Fi networks.

The other sensors 208 can include proximity sensors 311. The proximity sensors 311 fall in to one of two camps: active proximity sensors and "passive" proximity sensors. As used herein, a "proximity sensor component" comprises a signal receiver only that does not include a corresponding transmitter to emit signals for reflection off an object to the signal receiver. A signal receiver only can be used due to the fact that a user's body or other heat generating object external to device, such as a wearable electronic device worn by user, serves as the transmitter.

Illustrating by example, in one the proximity sensor components comprise a signal receiver to receive signals from objects external to the housing (201) of the electronic device (101). In one embodiment, the signal receiver is an infrared signal receiver to receive an infrared emission from an object such as a human being when the human is proximately located with the electronic device (101). In one or more embodiments, the proximity sensor component is configured to receive infrared wavelengths of about four to about ten micrometers. This wavelength range is advantageous in one or more embodiments in that it corresponds to the wavelength of heat emitted by the body of a human being.

Additionally, detection of wavelengths in this range is possible from farther distances than, for example, would be the detection of reflected signals from the transmitter of a proximity detector component. In one embodiment, the proximity sensor components have a relatively long detection range so as to detect heat emanating from a person's body when that person is within a predefined thermal reception radius. For example, the proximity sensor component may be able to detect a person's body heat from a distance of about fifteen feet in one or more embodiments. The ten-foot dimension can be extended as a function of designed optics, sensor active area, gain, lensing gain, and so forth.

Proximity sensor components are sometimes referred to as a "passive IR detectors" due to the fact that the person is the active transmitter. Accordingly, the proximity sensor component requires no transmitter since objects disposed external to the housing deliver emissions that are received by the infrared receiver. As no transmitter is required, each proximity sensor component can operate at a very low power level. Simulations show that a group of infrared signal receivers can operate with a total current drain of just a few microamps.

In one embodiment, the signal receiver of each proximity sensor component can operate at various sensitivity levels so as to cause the at least one proximity sensor component to be operable to receive the infrared emissions from different distances. For example, the one or more processors (211) of the electronic device (101) can cause each proximity sensor component to operate at a first "effective" sensitivity so as to receive infrared emissions from a first distance. Similarly, the one or more processors (211) of the electronic device (101) can cause each proximity sensor component to operate at a second sensitivity, which is less than the first sensitivity, so as to receive infrared emissions from a second distance, which is less than the first distance.

By contrast, proximity detector components include a signal emitter and a corresponding signal receiver, which constitute an "active IR" pair. While each proximity detector component can be any one of various types of proximity sensors, such as but not limited to, capacitive, magnetic, inductive, optical/photoelectric, imager, laser, acoustic/sonic, radar-based, Doppler-based, thermal, and radiation-based proximity sensors, in one or more embodiments the proximity detector components comprise infrared transmitters and receivers. The infrared transmitters are configured, in one embodiment, to transmit infrared signals having wavelengths of about 860 nanometers, which is one to two orders of magnitude shorter than the wavelengths received by the proximity sensor components. The proximity detector components can have signal receivers that receive similar wavelengths, i.e., about 860 nanometers.

In one or more embodiments, each proximity detector component can be an infrared proximity sensor set that uses a signal emitter that transmits a beam of infrared light that reflects from a nearby object and is received by a corresponding signal receiver. Proximity detector components can be used, for example, to compute the distance to any nearby object from characteristics associated with the reflected signals. The reflected signals are detected by the corresponding signal receiver, which may be an infrared photodiode used to detect reflected light emitting diode (LED) light, respond to modulated infrared signals, and/or perform triangulation of received infrared signals.

The other sensors 208 can also include a motion sensor 312. The motion sensor 312 can include motion detectors, such as one or more accelerometers or gyroscopes. For example, an accelerometer may be embedded in the electronic circuitry of the electronic device (101) to show vertical orientation, constant tilt and/or whether the electronic device (101) is stationary. The measurement of tilt relative to gravity is referred to as "static acceleration," while the measurement of motion and/or vibration is referred to as "dynamic acceleration." A gyroscope can be used in a similar fashion.

Regardless of the type of motion sensors 312 that are used, in one embodiment the motion sensors 312 are also operable to detect movement, and direction of movement, of the electronic device (101) by a user. In one or more embodiments, the other sensors 208 and the motion sensors 312 can each be used to detect motion corresponding to a user's body or to human motion. These predefined motions can be small, and can include vibration, shaking, breathing, micromotions, and so forth.

For instance, if the user is walking, the motion sensors 312 can detect this movement. The one or more processors (211) can then extract parametric data from electronic signals delivered by these motion sensors 312 in response to the user walking. By comparing the parametric data to a reference file stored in memory (205) of the electronic device (101), the one or more processors (211) can identify the walking motion as corresponding to the motion of the user's body. Similarly, if the user is simply sitting in a chair, the motion sensors 312 can be used to detect body motions— even tiny ones—such as that of the user breathing.

The motion sensors 312 can be configured as an orientation detector that determines an orientation and/or movement of the electronic device (101) in three-dimensional space. The orientation detector can determine the spatial orientation of an electronic device (101) in three-dimensional space by, for example, detecting a gravitational direction. In addition to, or instead of, an accelerometer, an electronic compass can be included to detect the spatial orientation of the electronic device (101) relative to the earth's magnetic field. Similarly, one or more gyroscopes can be included to detect rotational orientation of the electronic device (101).

By comparing the parametric data extracted from this motion to a reference file stored in memory (205), a context engine can identify the fact that the movement that the electronic device (101) is experiencing is due to the fact that the electronic device (101) is proximately located with a user's torso, limbs, head, or appendages, or otherwise generally disposed along the user body instead of, for example, being placed on a table. Other user motion that can be readily detected by parametric data includes motion associated with driving, riding a bike, or simply shifting in their seat.

Turning now back to FIG. 2, in one or more embodiments an authentication system 227 is operable with the one or more processors 211. A first authenticator of the authentication system 227 can include an imager processing system 223. The imager processing system 223 can include one or more of an imager. In one embodiment, the imager comprises a two-dimensional imager configured to receive at least one image of an environment of the electronic device 101. In one embodiment, the imager comprises a two-dimensional Red-Green-Blue (RGB) imager. In another embodiment, the imager comprises an infrared imager. Other types of imagers suitable for use with the imager processing system 223 and the authentication system 227 will be obvious to those of ordinary skill in the art having the benefit of this disclosure.

Where included, the temperature sensor (307) can also take various forms. In one embodiment, the temperature sensor (307) is simply a proximity sensor component or referred to as presence sensor by detecting temperature change. In another embodiment, the temperature sensor (307) comprises a simple thermopile. In another embodiment, the temperature sensor (307) comprises an infrared imager that captures the amount of thermal energy emitted by an object. Other types of temperature sensors (307) will be obvious to those of ordinary skill in the art having the benefit of this disclosure.

The imager processing system 223 can be operable with a depth scanner 241. Where included, the depth scanner 241 can take a variety of forms. In a first embodiment, the depth scanner 241 comprises a pair of imagers separated by a predetermined distance, such as three to four images. This "stereo" imager works in the same way the human eyes do in that it captures images from two different angles and reconciles the two to determine distance.

In another embodiment, the depth scanner 241 employs a structured light laser. The structured light laser projects tiny light patterns that expand with distance. These patterns land on a surface, such as a user's face, and are then captured by an imager. By determining the location and spacing between the elements of the pattern, three-dimensional mapping can be obtained.

In still another embodiment, the depth scanner 241 comprises a time of flight device. Time of flight three-dimensional sensors emit laser or infrared pulses from a photodiode array. These pulses reflect back from a surface, such as the user's face. The time it takes for pulses to move from the photodiode array to the surface and back determines distance, from which a three-dimensional mapping of a surface can be obtained. Regardless of embodiment, the depth scanner 241 adds a third "z-dimension" to the x-dimension and y-dimension defining the two-dimensional image captured by the imager.

The authentication system 227 can be operable with a face analyzer 219. The face/context analyzer 219 can be configured to process an image or depth scan of an object and determine whether the object matches predetermined criteria by comparing the image or depth scan to one or more predefined authentication references stored in memory 205.

For example, the face/context analyzer 219 can operate as an authentication module configured with optical and/or spatial recognition to identify objects using image recognition, character recognition, visual recognition, facial recognition, color recognition, shape recognition, and the like. Advantageously, the face/context analyzer 219, operating in tandem with the authentication system 227, can be used as a facial recognition device to determine the identity of one or more persons detected about the electronic device 101.

In one embodiment when the authentication system 227 detects a person, one or both of the imager and/or the depth imager can capture a photograph and/or depth scan of that person. The authentication system 227 can then compare the image and/or depth scan to one or more predefined authentication references stored in the memory 205. This comparison, in one or more embodiments, is used to confirm beyond a threshold authenticity probability that the person's face—both in the image and the depth scan—sufficiently matches one or more of the predefined authentication references stored in the memory 205 to authenticate a person as an authorized user of the electronic device 101.

The face/context analyzer 219 can include a gaze detector 242. The gaze detector 242 can comprise sensors for detecting the user's gaze point. The gaze detector 242 can optionally include sensors for detecting the alignment of a user's head in three-dimensional space. Electronic signals can then be processed for computing the direction of user's gaze in three-dimensional space. The gaze detector 242 can further be configured to detect a gaze cone corresponding to the detected gaze direction, which is a field of view within which the user may easily see without diverting their eyes or head from the detected gaze direction. The gaze detector 242 can be configured to alternately estimate gaze direction by inputting images representing a photograph of a selected area near or around the eyes. It will be clear to those of ordinary skill in the art having the benefit of this disclosure that these techniques are explanatory only, as other modes of detecting gaze direction can be substituted in the gaze detector of FIG. 2.

The face/context analyzer 219 can include its own image/gaze detection-processing engine as well. The image/gaze detection-processing engine can process information to detect a user's gaze point. The image/gaze detection-processing engine can optionally also work with the depth scans to detect an alignment of a user's head in three-dimensional space. Electronic signals can then be delivered from the imager or the depth imager for computing the direction of user's gaze in three-dimensional space. The image/gaze detection-processing engine can further be configured to detect a gaze cone corresponding to the detected gaze direction, which is a field of view within which the user may easily see without diverting their eyes or head from the detected gaze direction. The image/gaze detection-processing engine can be configured to alternately estimate gaze direction by inputting images representing a photograph of a selected area near or around the eyes. It can also be valuable to determine if the user wants to be authenticated by looking directly at device. The image/gaze detection-processing engine can determine not only a gazing cone but also if an eye is looking in a particular direction to confirm user intent to be authenticated.

Beneficially, this optical recognition performed by the authentication system 227 operating in conjunction with the face and/or gaze and/or environment and/or multi-image analyzer 219 allows access to the electronic device 101 only when one of the persons detected about the electronic device 101 are sufficiently identified as an authorized user of the electronic device 101. Accordingly, in one or more embodiments the one or more processors 211, working with the authentication system 227 and the face and/or gaze and/or environment and/or multi-image analyzer 219 can determine whether at least one image captured by the imager processing system 223 matches a first predefined criterion, whether at least one facial depth scan captured by the depth scanner 224 matches a second predefined criterion, and whether the thermal energy identified by the thermal sensor 225 matches a third predefined criterion, with the first criterion, second criterion, and third criterion being defined by the reference files and predefined temperature range. The first criterion may be a skin color, eye color, and hair color, while the second criterion is a predefined facial shape, ear size, and nose size. The third criterion may be a temperature range of between 95 and 101 degrees Fahrenheit. In one or more embodiments, the one or more processors 211 authenticate a person as an authorized user of the electronic device 101 when the at least one image matches the first predefined criterion, the at least one facial depth scan matches the second predefined criterion, and the thermal energy matches the third predefined criterion.

In one or more embodiments, a user can "train" the electronic device 101 by storing predefined authentication references 216 in the memory 205 of the electronic device 101. Illustrating by example, a user may take a series of pictures. They can include identifiers of special features such as eye color, skin color, hair color, weight, and height. They can include the user standing in front of a particular wall, which is identifiable by the environmental analyzer from images captured by the imager processing system 223. They can include the user raising a hand, touching hair, or looking in one direction, such as in a profile view. These can then be stored as predefined authentication references 216 in the memory 205 of the electronic device 101.

Other components 226 operable with the one or more processors 211 can include output components such as video, audio, and/or mechanical outputs. For example, the output components may include a video output component or auxiliary devices including a cathode ray tube, liquid crystal display, plasma display, incandescent light, fluorescent light, front or rear projection display, and light emitting diode indicator. Other examples of output components include audio output components 245 such as a loudspeaker disposed behind a speaker port or other alarms and/or buzzers and/or a mechanical output component such as vibrating or motion-based mechanisms.

The other components 226 can optionally include a barometer operable to sense changes in air pressure due to elevation changes or differing pressures of the electronic device 101. Where included, in one embodiment the barometer includes a cantilevered mechanism made from a piezoelectric material and disposed within a chamber. The cantilevered mechanism functions as a pressure sensitive valve, bending as the pressure differential between the chamber and the environment changes. Deflection of the cantilever ceases when the pressure differential between the chamber and the environment is zero. As the cantilevered material is piezoelectric, deflection of the material can be measured with an electrical current.

A context engine 213 can then operable with the various sensors to detect, infer, capture, and otherwise determine persons and actions that are occurring in an environment about the electronic device 101. For example, where included one embodiment of the context engine 213 determines assessed contexts and frameworks using adjustable algorithms of context assessment employing information, data, and events. These assessments may be learned through repetitive data analysis. Alternatively, a user may employ the user interface 202 to enter various parameters, constructs, rules, and/or paradigms that instruct or otherwise guide the context engine 213 in detecting multi-modal social cues, emotional states, moods, and other contextual information. The context engine 213 can comprise an artificial neural network or other similar technology in one or more embodiments.

In one or more embodiments, the context engine 213 is operable with the one or more processors 211. In some embodiments, the one or more processors 211 can control the context engine 213. In other embodiments, the context engine 213 can operate independently, delivering information gleaned from detecting multi-modal social cues, emotional states, moods, and other contextual information to the one or more processors 211. The context engine 213 can receive data from the various sensors. In one or more embodiments, the one or more processors 211 are configured to perform the operations of the context engine 213.

In one or more embodiments, the one or more processors 211 can be operable with the various authenticators of the authentication system 227. For example, the one or more processors 211 can be operable with a first authenticator and a second authenticator. Where more authenticators are included in the authentication system 227, the one or more processors 211 can be operable with these authenticators as well.

Embodiments of the disclosure contemplate that where there are multiple electronic devices 101,102 in a particular environment 100, each having a voice assistant module, there may be instances where one voice assistant module is not able to distinguish between the voice-synthesized audio output streams of the other electronic devices. For example, if three or more electronic devices are in a particular environment, and each voice assistant only has a generic predefined voice synthesis model, device A will not be able to distinguish between the voice-synthesized audio output stream of device B and the voice-synthesized audio output stream of device C. Moreover, device A will not know to which person device B belongs, and will have the same lack of information for device C.

Advantageously, embodiments of the present disclosure provide a solution to this problem by customizing the voice-synthesized audio output streams 106,107 from each electronic device 101,102 as a function of one or more audible characteristics 118,119 extracted from the voices 104,105—or other biometric data—of the authorized users 108,109 of each electronic device 101,102. Examples of the one or more audible characteristics 118,119 include one or more of pitch, timbre, cadence, rhythm, volume, spectrum, or combinations thereof.

In this illustration, a first user 108 owns, and is authorized to use, a first electronic device 101. Similarly, a second user 109 owns, and is authorized to use, a second electronic device 102. Each electronic device 101,102 includes a voice assistant module. The first user 108 and the second user 109 are engaged in a conversation.

In accordance with the method 103 shown in FIG. 1, the voice-synthesized audio output streams 106,107 of the electronic devices 101,102 have been customized as a function of one or more audible characteristics 118,119 of the voices 104,105 of each user 108,109. To wit, each voice-synthesized audio output stream 106,107 from each electronic device 101,102 is generated as a function of one or more audible characteristics 118,119 extracted from voice input, e.g., voices 104,105, received from each authorized user 108,109 of each respective electronic device 101,102. In one or more embodiments, an acoustic watermark 116,117 has further been applied to each voice-synthesized audio output stream 106,107. In one or more embodiments, the acoustic watermark 116,117 indicates that the voice-synthesized audio output streams 106,107 are machine made, and are not human voices 104,105.

Illustrating by example, at some time prior to this conversation, as shown at step 110, the electronic devices 101,102 have each received, with one or more sensors, audio input, e.g., voices from the users 108,109 similar to the voices 104,105 shown in FIG. 1. At decision 111, the voice assistant modules of the electronic devices 101,102 determine whether the this audio input is from an authorized user, e.g., first user 108 for first electronic device 101 and second user 109 for second electronic device 102, or from an unauthorized user, e.g., second user 109 for first electronic device 101 and first user 108 for second electronic device 102.

Decision 111 can occur in a number of ways. As noted above, in one or more embodiments an authentication system (227) operating in conjunction with the face and/or gaze and/or environment and/or multi-image analyzer (219) authenticates an authorized user where at least one image captured by the imager processing system (223) matches a first predefined criterion, whether at least one facial depth scan captured by the depth scanner (224) matches a second predefined criterion, and whether the thermal energy identified by the thermal sensor (225) matches a third predefined criterion, with the first criterion, second criterion, and third criterion being defined by the reference files and predefined temperature range.

In another embodiment, decision 111 can determine whether the person is an authorized user using a fingerprint sensor disposed along the housing of the electronic device 101,102. The fingerprint sensor can capture a fingerprint image that can be used to authenticate a user of an electronic device 101,102. As used herein, a fingerprint image refers to a digital image and/or any other type of data representing the print pattern features that distinctly identify a user by a fingerprint of a finger. The fingerprint sensor can also include a presence sensor that periodically detects a presence of a warm object near the fingerprint sensor. In implementations, a fingerprint sensor can also be implemented to detect user presence, rather than implementing a separate presence sensor.

In another embodiment, decision 111 can determine whether the person is an authorized user using a pincode receiver. The pincode receiver can receive a Personal Identification Number (PIN) code or a pass code from a user.

In another embodiment, decision 111 can determine whether the person is an authorized user using the audio processor (209). The audio processor (209) can include a voice recognition engine comprising executable code, hardware, and various voice print templates (also referred to as "voice models"). The voice recognition engine can use the voice print templates to compare a voiceprint from received input and determine if a match exists. The voice recognition engine can extract voice recognition features from the voice data and generate a voiceprint. The voice recognition engine can compare the voiceprint to at least one predefined authentication reference, which may comprise a predefined voice print template.

In one or more embodiments, the audio processor (209) is configured to implement a voice control feature that allows a user to speak a specific device command to cause the one or more processors (211) to execute a control operation. For example, the user may say, "Authenticate Me Now." This statement comprises a device command requesting the one or more processors to cooperate with the authentication system (227) to authenticate a user. Consequently, this device command can cause the one or more processors (211) to access the authentication system (227) and begin the authentication process. In short, in one embodiment the audio processor (209) listens for voice commands, processes the commands and, in conjunction with the one or more processors (211), performs a touchless authentication procedure in response to voice input.

In another embodiment, decision 111 can determine whether the person is an authorized user user using an iris scanner. The iris scanner can capture images and/or thermal or infrared scans of a person's iris. The iris scanner can employ either or both of visible and near-infrared light. The iris scanner can capture high-contrast images of a person's iris, and can compare these images to one or more predefined authentication references to determine if there is a match to determine that a person is an authorized user of an electronic device 101.

Figure 5:
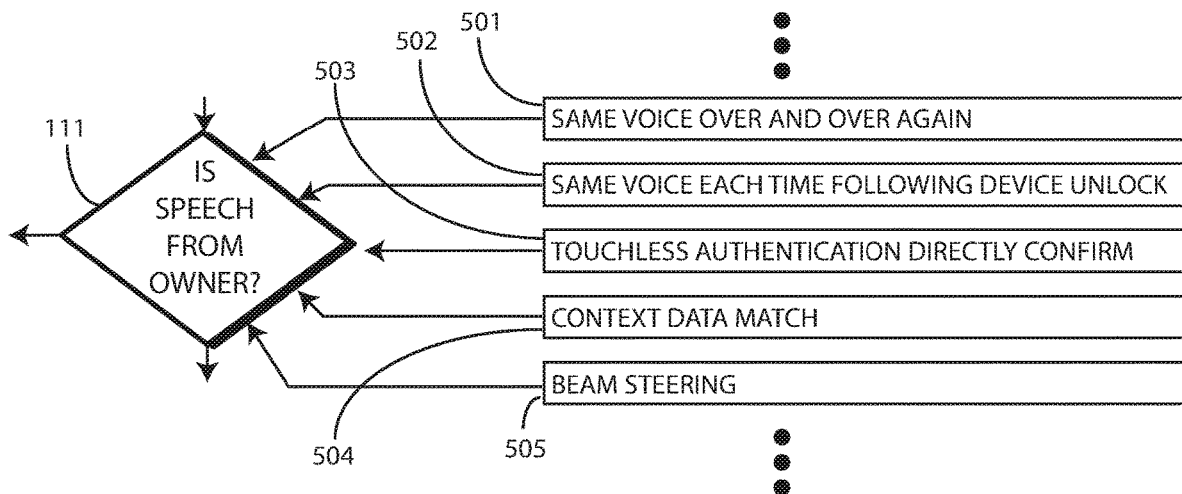
FIG. 5 illustrates one or more explanatory method steps in accordance with one or more embodiments of the disclosure.

Turning briefly now to FIG. 5, illustrated therein are more seamless methods of performing decision 111. Embodiments of the disclosure contemplate that some users may prefer a more seamless authentication. Accordingly, as shown at step 501, in one or more embodiments decision 111 can determine that a voice is received from an authorized user when it simply hears a voice again and again. As shown at step 502, in one or more embodiments decision 111 can determine that a voice is received from an authorized user when it hears the same voice immediately after the electronic device is unlocked.

Steps 501,502 allow an electronic device to be given to another person, e.g., a parent gives a smartphone to a child. Using steps 501,502, the voice assistant will assume the new person voice over time as an authorized user as the new owner engages in phone calls, conversations, or registers voice segment for the voice assistants. Without specifically registering new owner's voice, the electronic device listens in over a day's or more communication, for example, and can figure out who the new owner is. Moreover, the electronic device can adapt voice assistance to that of the new owner/user.

Other sensors can confirm identification functions as well. At step 503, a touchless authentication can occur using the imager processing system (223) as previously described. At step 504, a contextual data match can authenticate the user. Illustrating by example, an imager may capture a picture of a user by the user's car. The one or more processors (211) then read the license plate, confirming it belongs to the user, while the geo-locator confirms the person is in a known place, such as their driveway, and so forth. At step 505, beam steering can be used.

In the various embodiments of FIG. 5, the voice of an authorized user is analyzed and used for setting voice assistant characteristics. A voice segment of the detected speech is stored, analyzed (in the "cloud" or in the electronic device). As will be described in more detail below, this voice segment is then used for a voice-synthesis operation to alter predefined voice synthesis models to match the voice of the authorized user, or alternatively to be different yet related to the voice of the authorized user. In other words, in one or more embodiments the voice-synthesized audio output stream from the voice assistant will sound like the voice of the authorized user, or alternatively will sound different than voice of the authorized user but is unique to owner, due to the fact that the voice-synthesized audio output stream is a function of one or more audible characteristics extracted from voice input received from the authorized user.

It should be noted that the authentication techniques described above are merely illustrative of various approaches that can be used with electronic devices in accordance with one or more embodiments of the disclosure to identify an authorized user at decision 111. The authenticators can be used in alone or in combination. The authenticators are illustrative only, and are not intended to provide a comprehensive list of authenticators. Numerous other authenticators will be obvious to those of ordinary skill in the art having the benefit of this disclosure.

Turning now back to FIG. 1, where the voice input received by the electronic device 101,102 is from an authorized user of the electronic device 101,102, the voice-synthesized audio output stream 106,107 will no longer be that of a generic man or woman, as is the case in prior art systems. To the contrary, the voice-synthesized audio output stream 106,107 will rather be a dynamic voice that has been modified in some way by using some one or more audible characteristics 118,119 extracted from the voices 104,105 of the authorized user 108,109 of each respective electronic device 101,102. Accordingly, the voice-synthesized audio output stream 106 from the first electronic device 101 will mimic, or be a function of, the one or more audible characteristics 118 extracted from the voice 104 of the first user 108. Similarly, the voice-synthesized audio output stream 107 from the second electronic device 102 will mimic, or be a function of, the one or more audible characteristics 119 extracted from the voice 105 of the second user 109. As shown in FIG. 2 below, in one or more embodiments one or more processors (211) of the electronic device can prompt (243), at the user interface (202), for a user selection (244) between a first voice-synthesized audio output stream generated as a function of the one or more audible characteristics 118,119, but audibly distinct from a voice of the authorized user, and a second voice-synthesized audio output stream that mimics the voice of the authorized user.

One advantageous benefit of this voice-synthesized audio output stream 106,107 customization is to allow different voice assistants in different electronic devices to distinguish one another. This advantageously allows the voice assistants to communicate and interact with unique voices. Furthermore, if a device's voice-synthesized audio output stream 106,107 more closely resembles that of its owner, or is related to its owner, then it becomes easier to associate a particular synthetic voice-synthesized audio output stream 106,107 with that of its owner. This, in turn, makes the overall voice assistant interaction experience more relevant, accurate, and meaningful. Moreover, it causes the voice assistant to act more like a real human assistant. These properties are useful when another voice assistant is monitoring the sound field of more than one voice assistant and their respective users. Devices can work in the background to direct and tailor assistant based on the voice assistant identity.

One clear benefit of embodiments of the disclosure operation is device personalization. As the electronic device starts to deliver a voice-synthesized audio output stream 106,107, the voice assistant takes the personality of the owner (directly or by association). An interesting opportunity arises in the area of device-to-device engagement for future voice assistant enabled smart electronic devices. For example, one electronic device can talk to another electronic device passively, on its own, over the audio channel, at the right moment, in the right context, with voice characteristics matching or related to the corresponding owner voice.

Figure 4:
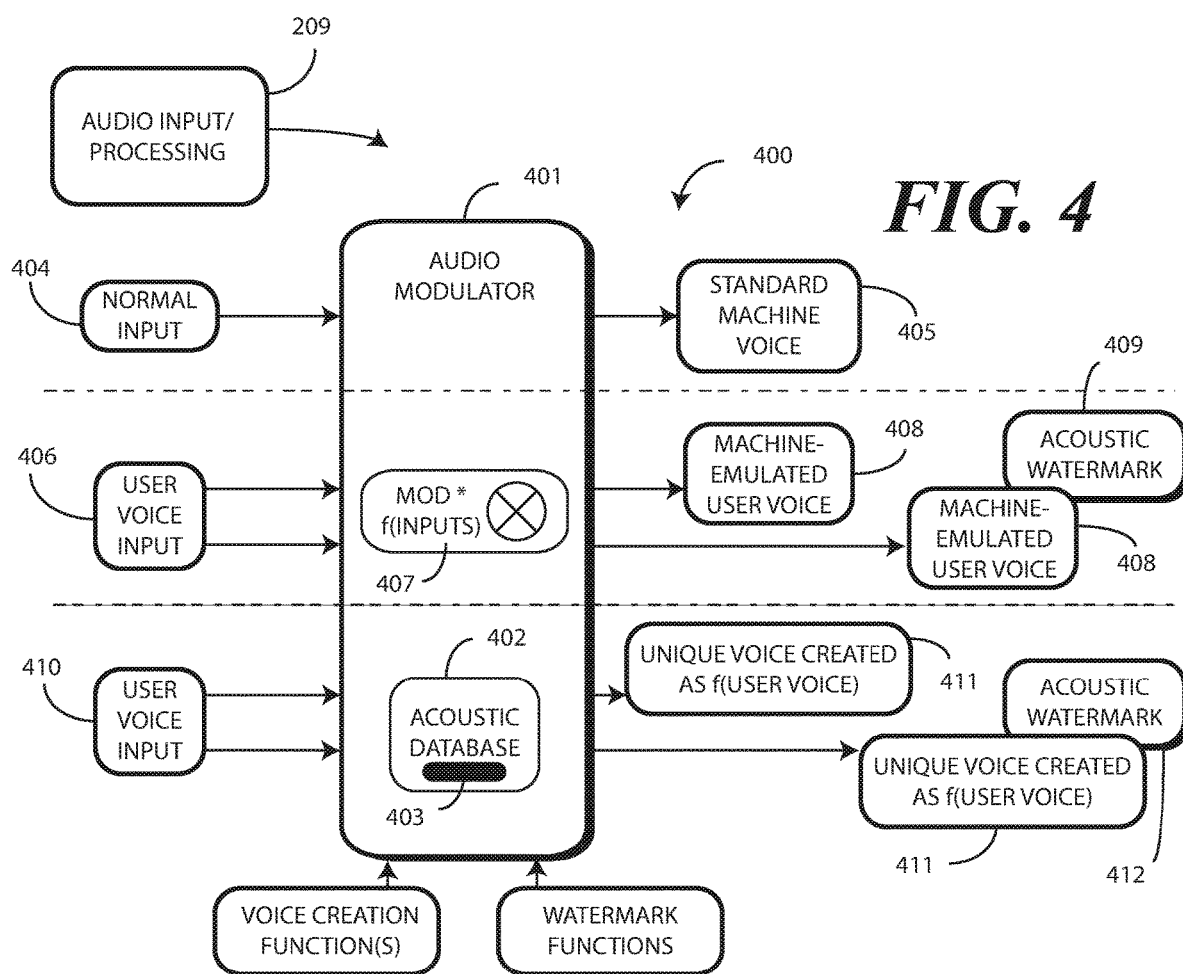
FIG. 4 illustrates one explanatory audio system in accordance with one or more embodiments of the disclosure.

In one or more embodiments, if decision 111 determines that the voice input is received form an authorized user of an electronic device, step 112 includes an audio synthesizer of the electronic device generating a voice-synthesized audio output stream 106,107 as a function of the one or more audible characteristics 118,119 extracted from voice input received from an authorized user of the electronic device 101,102. In one embodiment, step 112 comprises extracting, with one or more processors (211), the one or more audible characteristics (118,119) of the audio input from the authorized user, and generating, with an audio synthesizer, a voice-synthesized audio output stream 106,107 as a function of the one or more audible characteristics 118,119. As noted above, in one or more embodiments at step 114, the method 103 can further apply an acoustic watermark 116,117 to the voice-synthesized audio output stream 106,107 indicating that the voice-synthesized audio output stream 106,107 is machine made. Turning briefly to FIG. 4, illustrated therein are examples of how these operations can occur.

Illustrated in FIG. 4 is a voice assistant module 400 that includes the audio processor 209. In this illustrative embodiment, the audio processor 209 includes an audio synthesizer 401. The audio synthesizer is operable with an acoustic database 402, in which one or more predefined voice synthesis models 403 are stored.

Under normal or default operation, when input 404 is received, the audio synthesizer 401 employs a predefined voice synthesis model 403 to generate a voice-synthesized audio stream output 405. This voice-synthesized audio stream output 405 would be the "generic" male or female voice output by the voice assistant module 400. This is how prior art voice assistants function.

In accordance with one or more embodiments of the disclosure, however, when a voice input 406 is received from an authorized user, one or more audible characteristics 407 can be extracted from the voice input 406. The audio synthesizer 401 can then generate a voice-synthesized audio stream output 408 that mimics the voice of the user. Where this is the case, the voice-synthesized audio stream output 408 generated by the voice assistant module 400 would sound exactly like the voice of the authorized user.

In one or more embodiments, the audio synthesizer 401 can generate the voice-synthesized audio stream output 408 mimicking the authorized user, and also apply an acoustic watermark 409 to the voice-synthesized audio stream output 408 indicating that the voice-synthesized audio stream output 408 is machine made. As noted above, an acoustic watermark 409 is a portion of the voice-synthesized audio stream output 408 that also has an additional acoustic signal integrated therein. In one or more embodiments, the acoustic watermark 409 is inaudible or imperceptible to a user. In one or more embodiments, the acoustic watermark 409 comprises sound waves having a frequency above about 20,000 Hertz. Other frequencies and codes, patterns, modulations within the acoustic spectrum can be employed for use as the acoustic watermark 409 as well.

In one or more embodiments, the acoustic watermark 409 is integrated into the voice-synthesized audio stream output 408 so that an electronic device having a voice recognition engine can identify the voice-synthesized audio stream output 408. In one or more embodiments, the acoustic watermark 409 can carry data, such as an identity of the electronic device, its owner, or other information.

This inclusion of the acoustic watermark 409 allows another electronic device to distinguish a person's voice from the voice-synthesized audio stream output 408 generated from that person's electronic device when the voice-synthesized audio stream output 408 is generated as a function of one or more audible characteristics extracted from the voice input 406. Thus, an electronic device having a voice assistant can, advantageously, distinguish voice sounds coming from a person and that person's electronic device. Moreover, embodiments of the disclosure allow for an electronic device to distinguish between electronic devices having voice assistants, as each voice assistant will have a distinct and unique voice-synthesized audio output stream.

In one or more embodiments, data is encoded into the acoustic watermark 409. This data can include an identifier of the other electronic device, such as an IMEI number, a SIM number, or other identifier of the electronic device. Similarly, the data can include an identifier of the owner of the electronic device. In one or more embodiments, the acoustic watermark 409 comprises an identification of the authorized user of an electronic device, such as their name, contact information (telephone number, email address, and so forth), or other identifying information. Other data that can be encoded into the acoustic watermark 409 will be obvious to those of ordinary skill in the art having the benefit of this disclosure.

In an alternate embodiment, when a voice input 410 is received from an authorized user, one or more audible characteristics 407 can again be extracted from the voice input 406. However, rather than mimicking the authorized user's voice as was the case with voice-synthesized audio stream output 408, the one or more audible characteristics 407 can be used as inputs for a function that modifies one of the predefined voice synthesis models 403 stored in the acoustic database 402. This causes the voice-synthesized audio stream output 411 not to mimic the authorized user, but to be uniquely modified by the one or more audible characteristics 407 so as to create a unique voice-synthesized audio stream output 411 that is associated only with the authorized user. In one or more embodiments, the user can select between these altered voices. In other embodiments, the selection can happen automatically based on device context, surrounding environment, and settings.

Illustrating by example, the predefined voice synthesis model 403 may be modified only as a function of the pitch of the voice of the authorized user. This would alter the pitch of the predefined voice synthesis model 403, but would not match the user in cadence and rhythm, for example Similarly, predefined voice synthesis model 403 may be modified only as a function of the timber and cadence of the voice of the authorized user. Again, this creates a voice-synthesized audio stream output 411 that is unique to the authorized user due to the fact that only that authorized user has that exact timber and cadence. However, the voice-synthesized audio stream output 411 will not mimic the voice of the authorized user. In one or more embodiments the predefined voice synthesis model 403 can be modified as a function of one or more of pitch, timber, cadence, rhythm, volume, spectrum, or combinations thereof.

It should be noted that other biometric data can be used in place of the one or more audible characteristics 407. When extracted from the voice input 410, the one or more audible characteristics 407 are digital representations of acoustic data. Accordingly, other biometric information such as fingerprint, facial shape, iris features, or other biometric attributed can serve as inputs for the modifying function for the predefined voice synthesis model to create a voice-synthesized audio stream output 411 that is unique to the authorized user only. Still other inputs for the modifying function for the predefined voice synthesis model to create a voice-synthesized audio stream output 411 that is unique to the authorized user will be obvious to those of ordinary skill in the art having the benefit of this disclosure. As before, the audio synthesizer 401 can also apply an acoustic watermark 412 to the voice-synthesized audio stream output 408 indicating that the voice-synthesized audio stream output 408 is machine made.

Turning now back to FIG. 1, once steps 112,114 have been completed, at step 115 the voice assistants of each electronic device 101,102 can engage each other acoustically. In this illustrative example, the first user 108 and the second user 109 are ordering food to be delivered form a nearby restaurant. As shown, the first user 108 states, to the voice assistant in his electronic device 101, and with his voice 104, "Order the vegan special." The voice assistant in the electronic device 101 identifies the voice 104 as emanating from the first user 108, who is authorized to use the electronic device 101. Accordingly, the first electronic device 101 prepares to order the vegan special from a nearby restaurant.

The voice assistant in the second electronic device 102, receives this voice 104 as voice input. Since the first user 108 is not authorized to use the second electronic device 102, it receives the voice 104 as audio input from an unauthorized user of the second electronic device 102. Electronic representations of this voice input and/or one or more extracted audible characteristics can be stored in a memory of the second electronic device 102.

Similarly, the second user 109 states, to the voice assistant in his electronic device 102, and with his voice 105, "Order a burger with fries." The voice assistant in the second electronic device 102 identifies the voice 105 as emanating from the second user 109, who is authorized to use the second electronic device 102. Accordingly, the second electronic device 101 prepares to order the carnivore special from a nearby restaurant.

The voice assistant in the first electronic device 101, receives this voice 105 as voice input. Since the second user 109 is not authorized to use the first electronic device 101, it receives the voice 105 as audio input from an unauthorized user of the first electronic device 101. As before, electronic representations of this voice input and/or one or more extracted audible characteristics can be stored in a memory of the first electronic device 101.

However, in this illustration the voice assistant of the first electronic device 101 has heard this voice 105 before. Moreover, the first user 108 has delivered input to the user interface (202) of the electronic device 101 identifying the voice 105 as emanating from a friend, namely, the second user 109, Mac. Accordingly, while the voice assistant of the first electronic device 101 identifies Mac's voice 105 as that of an unauthorized user, it also identifies the fact that it is, indeed, Mac's voice.

The one or more processors (211) of the first electronic device 101 access an accounting application on the first electronic device 101. The one or more processors (211) discover that Buster, the first user 108, owes Mac, the second user 109, lunch. Accordingly, in response to the voice input comprising Mac's voice 109, the voice assistant of the first electronic device 101 generates a voice-synthesized audio output stream 106 in accordance with one or more embodiments of the disclosure.

In this example, the voice assistant of the first electronic device 101 generates the voice-synthesized audio output stream 106 as a function of one or more audible characteristics 118 extracted from voice input received from the first user 108. Moreover, the voice assistant of the first electronic device 101 applies an acoustic watermark 116 to the voice-synthesized audio output stream 106. In this illustrative embodiment, the acoustic watermark 116 indicates that the voice-synthesized audio output stream 106 is machine made. In addition, the acoustic watermark 116 comprises an identification of the authorized user of the first electronic device 101, which is the first user 108.

The voice assistant of the second electronic device 102 receives this voice-synthesized audio output stream 106 as additional audio input. Despite the fact that the voice-synthesized audio output stream 106 mimics the first user's voice 104, the voice assistant of the second electronic device 102 recognizes that the voice-synthesized audio output stream 106 emanates from the first electronic device 101 and not the first user 108 due to the fact that the voice-synthesized audio output stream 106 comprises the acoustic watermark 116 indicating that the voice-synthesized audio output stream 106 is machine made. In this illustration, the one or more processors (211) of the second electronic device also determine that the first electronic device 101 belongs to the first user 108 by reading the acoustic watermark 116.

In this example, the voice-synthesized audio output stream 106 states, "I can order both—Buster owes Mac lunch." The one or more processors (211) understand this to mean that the first electronic device 101 will order both items, so no action is necessary by the second electronic device 102. In view of this, the order for the carnivore special is canceled at the second electronic device 102.

To confirm that the voice-synthesized audio output stream 106 was received and interpreted correctly, the voice assistant in the second electronic device 102, in response to the voice input comprising the voice-synthesized audio output stream 106, generates another voice-synthesized audio output stream 107 in accordance with one or more embodiments of the disclosure.

In this example, the voice assistant of the second electronic device 102 generates the voice-synthesized audio output stream 107 as a function of one or more audible characteristics 119 extracted from voice input received from the second user 109. Moreover, the voice assistant of the second electronic device 102 applies an acoustic watermark 117 to the voice-synthesized audio output stream 107. In this example, the acoustic watermark 117 indicates that the voice-synthesized audio output stream 107 is machine made. However, for illustration purposes presume that the acoustic watermark 117 does not identify the authorized user of the second electronic device 102.

This lack of identification of the authorized user of the second electronic device 102 is not a problem for the first electronic device 101. In one or more embodiments, the voice assistant of the first electronic device 101 receives this voice-synthesized audio output stream 107 as voice input. It reads the acoustic watermark 117 and determines that the voice-synthesized audio output stream 107 is machine made. Since no identification is provided, the voice assistant of the first electronic device 101 extracts one or more audio characteristics 120 from the voice-synthesized audio output stream 107. The voice assistant of the first electronic device 101 then compares the one or more audio characteristics 120 from the voice-synthesized audio output stream 107 to the one or more audible characteristics 119 received from the voice 105 of the second user 109 to determine whether they substantially match. Where the one or more audio characteristics 120 from the voice-synthesized audio output stream 107 substantially match the one or more audible characteristics 119 received from the voice 105 of the second user 109, in one or more embodiments the voice assistant of the first electronic device 101 identifies, in the memory (205) of the first electronic device, that the voice-synthesized audio output stream 107 emanates from an electronic device belonging to the second user 109. Accordingly, the one or more processors (211) of the first electronic device 101 place the order for both the vegan special and the carnivore special, with full knowledge of who ordered what, who said what, and which device said what.

As illustrated in this example, when two users 108,109 are sitting across from one another at a table engaging in an interesting lively conversation, their respective electronic devices 101,102 configured in accordance with one or more embodiments of the disclosure may be on the table next to them. One device picks up an interesting voice statement, word, comment, topic, and knows who said it (as device knows user voice). It can dialog with the other device over voice-assisted engagement in a lively accurate and human-like manner. Accordingly, each device could engage in its own communication on the side, sharing knowledge, and popping in when needed. Further, the users 108,109 may find it entertaining to listen in to "relevant" machine-to-machine engagement pertaining to the subject being discussed by the users 108,109.

Finally, at step 113, the voice assistants of the electronic devices 101,102 can optionally detect context and modify their respective voice-synthesized audio output streams 106, 107 as a function of this context. Illustrating by example, information such as location, time of day, date, calendaring information, user preferences, communication records (text, phone, multimedia), social media operations, and so forth can be accessed in one or more embodiments. Illustrating by example, if the first user 109 had a trip to Germany planned in a calendar, the voice-synthesized audio output stream 107 may have been with a German accent, and so forth.

Figure 6:
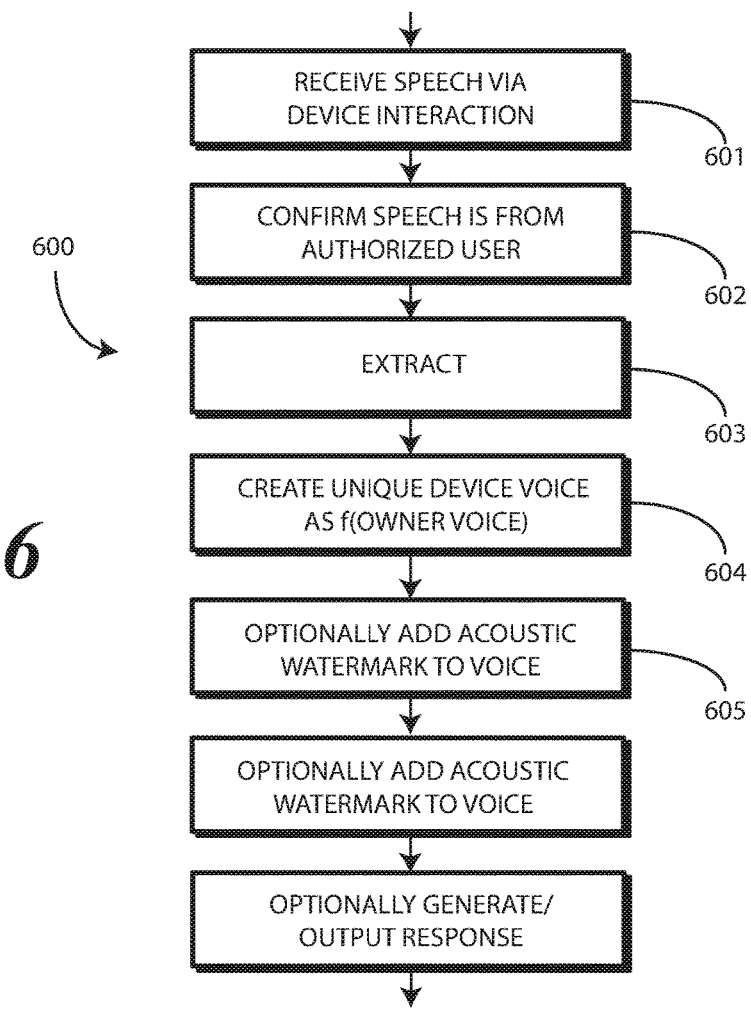
FIG. 6 illustrates one explanatory method in accordance with one or more embodiments of the disclosure.

Turning now to FIG. 6, illustrated therein is one explanatory method 600 in accordance with one or more embodiments of the disclosure. At step 601, the method 600 receives, with one or more sensors of an electronic device, audio input. At step 602, the method 600 identifies, with one or more processors of the electronic device, that the audio input received at step 601 is from an authorized user of the electronic device. In one or more embodiments, step 602 comprises identifying the authorized user of the electronic device from one or more audible characteristics extracted from the voice input received at step 601.

At step 603, the method 600 extracts, with the one or more processors, one or more audible characteristics of the audio input from the authorized user. In one or more embodiments, the one or more audible characteristics extracted at step 603 comprise one or more of pitch, timbre, cadence, rhythm, volume, spectrum, or combinations thereof. Other extractable audible characteristics will be obvious to those of ordinary skill in the art having the benefit of this disclosure.

At step 604, the method 600 generates, with an audio synthesizer, a voice-synthesized audio stream output as a function of the one or more audible characteristics extracted at step 603. In one or more embodiments, step 604 comprises the audio synthesizer generating the voice-synthesized audio output stream by modifying a predefined voice synthesis model with the one or more audible characteristics to obtain the voice-synthesized audio output stream. In one or more embodiments, the voice-synthesized audio output stream generated at step 604 mimics a voice of the authorized user of the electronic device. In one or more embodiments, step 604 can include prompting, at a user interface of the electronic device, for a user selection between a first voice-synthesized audio output stream generated as a function of the one or more audible characteristics, but audibly distinct from a voice of the authorized user, and a second voice-synthesized audio output stream that mimics the voice of the authorized user.

In one or more embodiments, optional step 605 comprises applying an acoustic watermark to the voice-synthesized audio output stream. In one or more embodiments, the acoustic watermark indicates that the voice-synthesized audio output stream is machine made. In one or more embodiments, the acoustic watermark is inaudible by human beings. In one embodiment, the acoustic watermark comprises sound waves having a frequency above about 20,000 Hertz in order not to be audible in one embodiment. In other embodiments, audibility might be tolerated if it is infrequent such as at first engagement, and once other audio identified, it is labeled and tracked (no need for watermarking to rediscover). In one or more embodiments, the acoustic watermark comprises an identification of the authorized user.

The method 600 of FIG. 6 offers several advantages over prior art methods. To begin, the method 600 enhances voice assistant features in an electronic device, making the voice assistant more like a human assistant. Moreover, it allows a voice assistant to listen in the background and able to quietly take notes of conversations. The method allows voice assistants to be able to tell which assistant (and which owner via association or embedded watermarks) said what during device interactions.

In one or more embodiments, voice assistant matching or related to owner's voice are encoded in such a way that when received by another device, are recognized as device voice belonging to that user. In certain situations driven by need for privacy, security, or device operation under noisy environments, voice assisted characteristics profiles can adaptively be switched, e.g., certain voice assisted characteristics can be more audible in certain environmental condition, others can be more suitable based on type of setting (concert, dinner, date, user mood, company, location) and so forth. The method 600 ensures no two devices can have similar voice characteristics. At least no two devices in the same geographic location using location detection.

Figure 7:
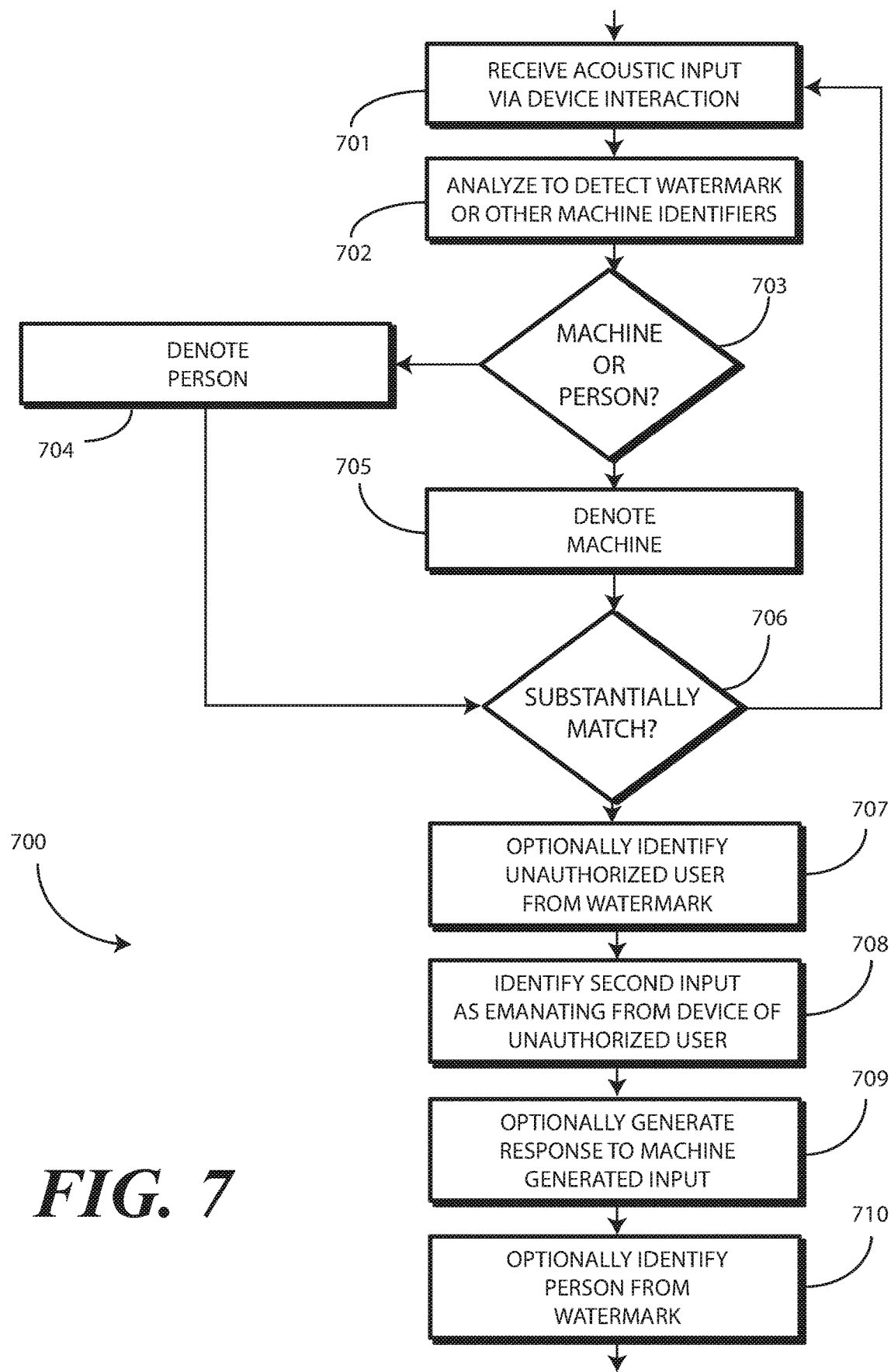
FIG. 7 illustrates another explanatory method in accordance with one or more embodiments of the disclosure.

Turning now to FIG. 7, illustrated therein is another explanatory method 700 in accordance with one or more embodiments of the disclosure. At step 701, the method 700 includes receiving, with one or more sensors, a first audio input from an unauthorized user of the electronic device. In one or more embodiments, step 701 also comprises receiving, with the one or more sensors, a second audio input. In one or more embodiments, the second acoustic input comprises an acoustic watermark indicating that the second audio input is machine made.

At step 702, the method 700 analyzes the first audio input and the second audio input to determine whether there are any watermarks or other identifiers that either the first audio input or the second audio input is machine made. Illustrating by example, step 702 can comprise reading the watermark of the second audio input to determine that the second audio input is machine made at decision 703 and denoted at step 705. However, since the first audio input had no acoustic watermark, decision 703 will determine that this emanated from a person, as denoted at 704.

In one or more embodiments, decision 706 determines, with one or more processors, whether one or more substantially matching audio characteristics are present in both the first audio input and the second audio input. Where they are, step 708 identifies, in a memory of the electronic device, the second audio input as emanating from another electronic device belonging to the unauthorized user. Optional and intermediate step 707 can comprise identifying, with the one or more processors, the unauthorized user from the acoustic watermark.

At optional step 709, the method 700 can generate, with an audio synthesizer, a voice-synthesized audio output response to the first audio input, and output, with an audio output device, the voice-synthesized audio output response in response to receiving the first audio input at step 701. In one or more embodiments, the voice-synthesized audio output response can address the unauthorized user, e.g., "Henry, thank you for the kind words." Optional step 709 can further comprise applying, with the audio synthesizer, another acoustic watermark to the voice-synthesized audio output stream. In one or more embodiments, the other acoustic watermark indicates that the voice-synthesized audio output stream is machine made. As noted at step 710, in one or more embodiments the acoustic watermark identifies the owner of the machine performing step 709.

Figure 8:
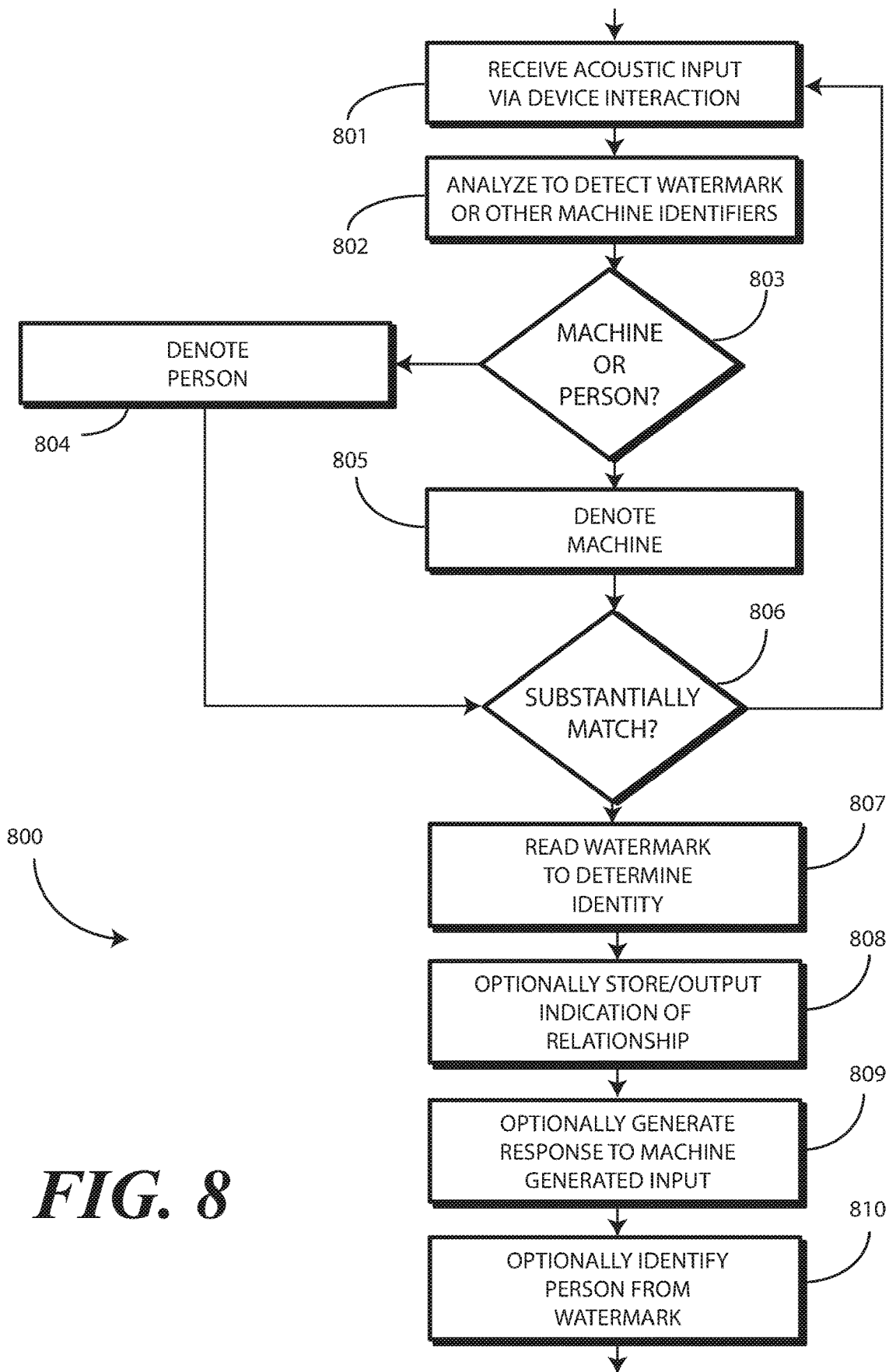
FIG. 8 illustrates another explanatory method in accordance with one or more embodiments of the disclosure.

Turning now to FIG. 8, illustrated therein is another method 800 in accordance with one or more embodiments of the disclosure. At step 801, the method 800 comprises receiving, with one or more sensors, a first audio input from an unauthorized user of the electronic device. In one or more embodiments step 801 also comprises receiving, with the one or more sensors, a second audio input. In one or more embodiments, the second input comprises an acoustic watermark indicating that the second audio input is machine made.

At step 802, the method 800 analyzes the first audio input and the second audio input to determine whether there are any watermarks or other identifiers that either the first audio input or the second audio input is machine made. Illustrating by example, step 802 can comprise reading the watermark of the second audio input to determine that the second audio input is machine made at decision 803 and denoted at step 805. However, since the first audio input had no acoustic watermark, decision 803 will determine that this emanated from a person, as denoted at 804.

In one or more embodiments, optional decision 806 determines, with one or more processors, whether one or more substantially matching audio characteristics are present in both the first audio input and the second audio input. Where they are, step 807 identifies the unauthorized user from an identifier in the acoustic watermark, and associates that identity with the person delivering the first audio input. This association can be stored in memory at step 808.

At optional step 809, the method 800 can generate, with an audio synthesizer, a voice-synthesized audio output response to the first audio input, and output, with an audio output device, the voice-synthesized audio output response in response to receiving the first audio input at step 801. In one or more embodiments, the voice-synthesized audio output response can address the unauthorized user, e.g., "Henry, message received. My thoughts are similar to yours." Optional step 809 can further comprise applying, with the audio synthesizer, another acoustic watermark to the voice-synthesized audio output stream. In one or more embodiments, the other acoustic watermark indicates that the voice-synthesized audio output stream is machine made. As noted at step 810, in one or more embodiments the acoustic watermark identifies the owner of the machine performing step 809.

Figure 9:
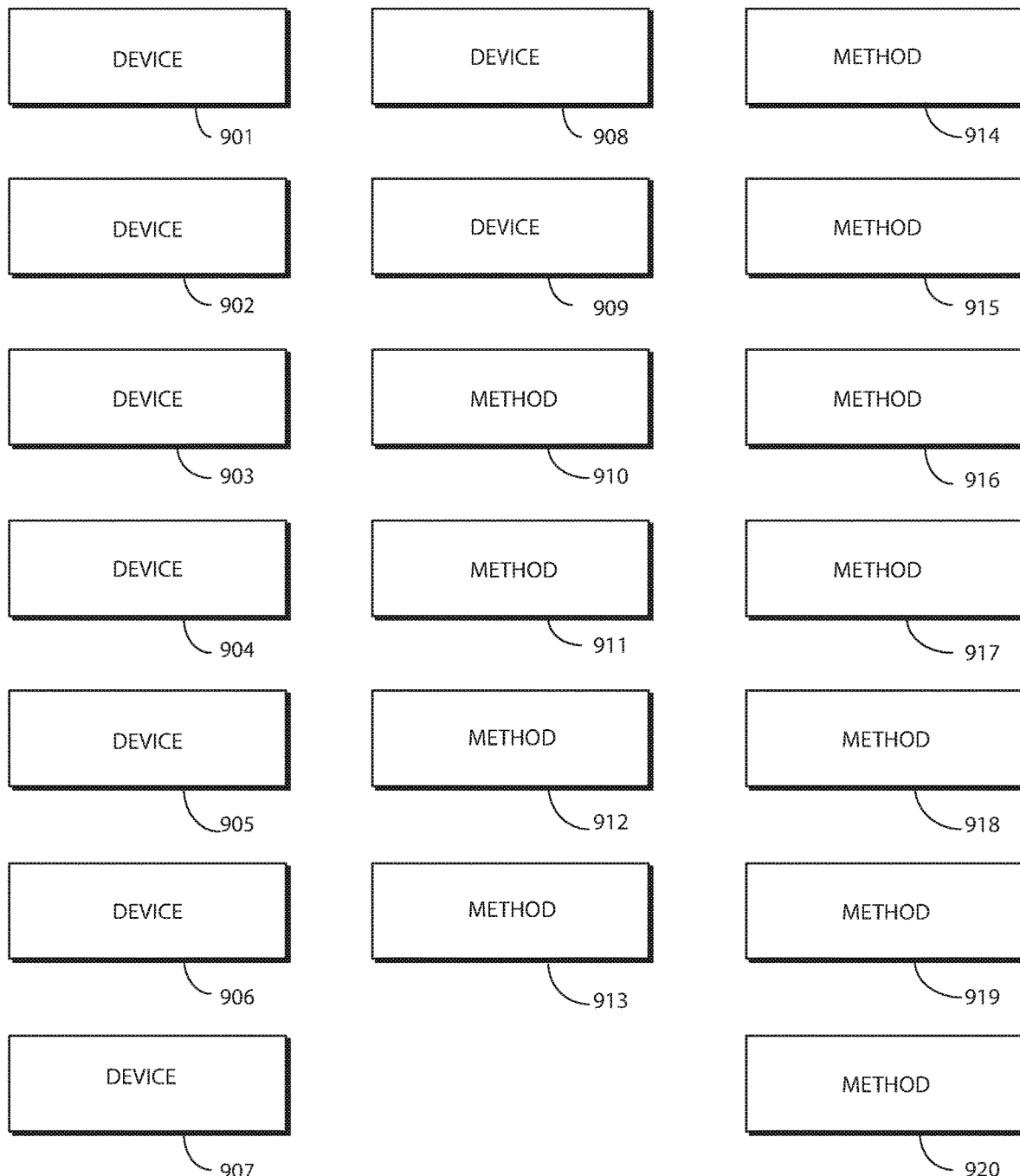
FIG. 9 illustrates one or more embodiments of the disclosure.

Turning now to FIG. 9, illustrated therein are various embodiments of the disclosure. At 901, an electronic device comprising an audio synthesizer generates a voice-synthesized audio output stream as a function of one or more audible characteristics extracted from voice input received from an authorized user of the electronic device. In one or more embodiments, 901 further includes applying an acoustic watermark to the voice-synthesized audio output stream. In one or more embodiments, the acoustic watermark indicates that the voice-synthesized audio output stream is machine made.

At 903, the acoustic watermark of 901 is inaudible. At 904, the acoustic watermark of 903 comprises sound waves having a frequency above about 20,000 Hertz.

At 904, the audio synthesizer of 901 generates the voice-synthesized audio output stream by modifying a predefined voice synthesis model with the one or more audible characteristics to obtain the voice-synthesized audio output stream. At 905, the voice-synthesized audio output stream of 904 mimics a voice of the authorized user.

At 905, the electronic device of 901 further comprises one or more processors and a user interface. At 905, the one or more processors prompt, at the user interface, for a user selection between a first voice-synthesized audio output stream generated as a function of the one or more audible characteristics, but audibly distinct from a voice of the authorized user, and a second voice-synthesized audio output stream that mimics the voice of the authorized user.

At 907, the one or more audible characteristics of 901 comprise one or more of pitch, timbre, cadence, rhythm, volume, spectrum, or combinations thereof At 908, the electronic device of 901 further comprises one or more processors. A 908, the one or more processors identify the authorized user of the electronic device from the one or more audible characteristics extracted from the voice input. At 909, the acoustic watermark of 901 comprises an identification of the authorized user.

At 910, a method in an electronic device comprises receiving, with one or more sensors, a first audio input from an unauthorized user of the electronic device. At 910, the method comprises also receiving, with the one or more sensors, a second audio input comprising an acoustic watermark indicating that the second audio input is machine made. At 910, the method comprises determining, with one or more processors, whether one or more substantially matching audio characteristics are present in both the first audio input and the second audio input. At 910, the method also comprises, where the one or more substantially matching audio characteristics are present in both the first audio input and the second audio input, identifying, in a memory of the electronic device, the first audio input as emanating from another electronic device belonging to the unauthorized user.

In one or more embodiments, once the device determines other device's identity from the acoustic watermark, it may not be necessary to use watermarks going forward to determine that the second audio input is machine made. Illustrating by example, since the machine made audio input has been identified, audio characteristics in a voice print matching process can be used to identify the machine made audio input in the future. Other techniques for recognizing the machine made audio input after initially identifying it as being machine made via an acoustic watermark will be obvious to those of ordinary skill in the art having the benefit of this disclosure.

At 911, the method of 910 further comprises identifying, with the one or more processors, the unauthorized user from the acoustic watermark. At 912, the method of 910 further comprises generating, with an audio synthesizer, a voice-synthesized audio output stream as a function of one or more audible characteristics extracted from voice input received from an authorized user of the electronic device. At 913, the method of 912 further comprises applying, with the audio synthesizer, another acoustic watermark to the voice-synthesized audio output stream. At 912, the other acoustic watermark indicates that the voice-synthesized audio output stream is machine made.

At 914, the method of 910 further comprises generating, with an audio synthesizer, a voice-synthesized audio output response to the first audio input. At 914, the method of 910 further comprises outputting, with an audio output device, the voice-synthesized audio output response in response to receiving the first audio input. At 915, the voice-synthesized audio output response of 914 addresses the unauthorized user.

At 916, a method in an electronic device comprises receiving, with one or more sensors, a first audio input from an unauthorized user of the electronic device. At 916, the method comprises also receiving, with the one or more sensors, a second audio input comprising an acoustic watermark indicating that the second audio input is machine made.

At 916, the method comprises determining, with one or more processors, whether one or more substantially matching audio characteristics are present in both the first audio input and the second audio input. At 916, the method comprises identifying, with the one or more processors, the unauthorized user from an identifier encoded into the acoustic watermark. At 916, the method comprises identifying, in a memory of the electronic device, the first audio input as emanating from another electronic device belonging to the unauthorized user.

At 917, the method of 916 comprises generating, with an audio synthesizer, a voice-synthesized audio output stream as a function of one or more audible characteristics extracted from voice input received from an authorized user of the electronic device. At 918, the method of 917 comprises applying, with the audio synthesizer, another acoustic watermark to the voice-synthesized audio output stream. At 918, the other acoustic watermark indicates that the voice-synthesized audio output stream is machine made.

At 919, the method of 918 further comprises identifying the authorized user of the electronic device. At 919, the other acoustic watermark of 918 comprises an identification of the authorized user. At 920, the method of 916 further comprises generating, with an audio synthesizer, a voice-synthesized audio output response to the first audio input, and outputting, with an audio output device, the voice-synthesized audio output response in response to receiving the first audio input.

Advantageously, embodiments of the disclosure allow a voice assistant to sound like its owner. In one or more embodiments, embedded acoustic watermarks distinguish machine sources from human sources.

Even where the output of the voice assistant does not mimic the owner of the device, in other embodiments a series of voice assistant characteristics, which are different from the owner but associated with the owner, e.g., pseudorandom generated voice sequence versions based on owner identity, can be used to create novel voice assistant voices that are uniquely associated with the owner. Additionally, data encoded in an acoustic watermark can link or associate a device with a particular person. When another voice assisted device hears this voice, it is therefore able to get content as related to actual owner.

Embodiments of the disclosure allow for novel voice synthesis. An electronic device can receive a sound information signal, modify a characteristic of a digital assistant voice synthesizer based on the received sound signal, and can create a synthetic speech signal using the modified voice synthesizer. Additionally, the electronic device can apply an acoustic watermark to the synthetic speech signal to indicate that the synthesized speech is synthetic, and can output the watermarked speech to an electroacoustic device.

Embodiments of the disclosure also allow for novel voice analysis. An electronic device can receive a sound information signal, and can analyze the sound information signal to determine a plurality of sound sources (whether emanating from a person or machine). In one or more embodiments the electronic device can determine a set of characteristics associated with the plurality of sound sources, determine a relationship between the plurality of sound sources based on at least one element of the set of characteristics, and, output a signal indicative of the relationship.

This relationship can be derived, at least in part, from an acoustic watermark. The methods described above provide an electronic device with the ability to set voice assistant characteristics related to user identity (match, different 1 . . . different N driven by seed/user ID). The methods described above allow a new device to determine new owner identity seamlessly and automatically by sampling and/or analyzing voice characteristics in support of voice assistant setting for adaptive device programming.

The methods described above enable another device to identify the voice assistant characteristics as belonging to a known user via embedded watermarks, pseudorandom characteristics, setting related to owner voice/seed, and others.

The methods described above allow an electronic device to adaptively switch voice assisted characteristics based on device context, environmental background, privacy, device security, environmental interference, background setting, nearby people, and so forth. The methods described above provide menu settings at a user interface that govern adaptive switching between synthesized voice assisted versions on the fly based of context and privacy including user mood, location, company, public, and private setting. Numerous other benefits and advantages will be obvious to those of ordinary skill in the art having the benefit of this disclosure.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims. Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. An electronic device, comprising an audio synthesizer, an audio output, an audio input, and one or more processors, the audio synthesizer generating a voice-synthesized audio output stream as a function of one or more audible characteristics extracted from voice input received from an authorized user of the electronic device, and applying an acoustic watermark to the voice-synthesized audio output stream, the acoustic watermark indicating that the voice-synthesized audio output stream is machine made, the one or more processors causing the audio output to output the voice-synthesized audio output stream in response to the audio input receiving another voice-synthesized audio output stream from a remote electronic device, the another voice-synthesized audio output stream comprising another acoustic watermark indicating the another voice-synthesized audio output stream is also machine made, and the one or more processors determining that the another voice-synthesized audio output is machine made from the another acoustic watermark.

2. The electronic device of claim 1, wherein the acoustic watermark is inaudible.

3. The electronic device of claim 2, wherein the acoustic watermark comprises sound waves having a frequency about 20,000 Hertz.

4. The electronic device of claim 1, the audio synthesizer generating the voice-synthesized audio output stream by modifying a predefined voice synthesis model with the one or more audible characteristics to obtain the voice-synthesized audio output stream.

5. The electronic device of claim 4, wherein the voice-synthesized audio output stream mimics a voice of the authorized user.

6. The electronic device of claim 1, further comprising a user interface, the one or more processors prompting, at the user interface, for a user selection between a first voice-synthesized audio output stream generated as a function of the one or more audible characteristics, but audibly distinct from a voice of the authorized user, and a second voice-synthesized audio output stream that mimics the voice of the authorized user.

7. The electronic device of claim 1, wherein the one or more audible characteristics comprise one or more of pitch, timbre, cadence, rhythm, volume, spectrum, or combinations thereof.

8. The electronic device of claim 1, the one or more processors identifying the authorized user of the electronic device from the one or more audible characteristics extracted from the voice input.

9. The electronic device of claim 8, the one or more processors further identifying the authorized user of the electronic device by receiving a plurality of instances of the voice input.

10. The electronic device of claim 8, the one or more processors further identifying the authorized user of the electronic device by repeatedly receiving instances of the voice input immediately after the electronic device is unlocked.

11. The electronic device of claim 10, the one or more processors identifying the authorized user of the electronic device without the authorized user registering the voice input with the one or more processors.

12. The electronic device of claim 1, the acoustic watermark comprising an identification of the electronic device.

13. The electronic device of claim 12, the identification comprising one of an International Mobil Equipment Identity (IMEI) number or a Subscriber Identification Module (SIM) number.

14. The electronic device of claim 1, the audio synthesizer further generating the voice-synthesized audio output stream as a function of a facial shape of the authorized user, iris features of the authorized user, or combinations thereof.

15. The electronic device of claim 1, the voice-synthesized audio output stream providing confirmation to the remote electronic device that the another voice-synthesized audio output stream was received and interpreted by the one or more processors of the electronic device.

16. The electronic device of claim 1, the one or more processors identifying an owner of the remote electronic device by comparing one or more audio characteristics extracted from the another voice-synthesized audio output stream to one or more other audio characteristics of other voice input previously received from the owner of the remote electronic device to determine whether the one or more audio characteristics and the one or more other audio characteristics substantially match.

17. The electronic device of claim 1, the audio synthesizer further generating the voice-synthesized audio output stream as a function of calendaring information, location information, or combinations thereof.

* * * * *